US009380322B2

(12) United States Patent
Kotecha et al.

(10) Patent No.: US 9,380,322 B2
(45) Date of Patent: Jun. 28, 2016

(54) VIDEO ON DEMAND ARCHITECTURE

(71) Applicant: Verizon Patent and Licensing Inc., Basking Ridge, NJ (US)

(72) Inventors: Lalit R. Kotecha, San Ramon, CA (US); William H. Stone, Doylestown, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 157 days.

(21) Appl. No.: 14/263,330

(22) Filed: Apr. 28, 2014

(65) Prior Publication Data

US 2014/0230000 A1    Aug. 14, 2014

Related U.S. Application Data

(62) Division of application No. 13/102,437, filed on May 6, 2011, now Pat. No. 8,719,876.

(51) Int. Cl.

| H04N 7/173 | (2011.01) |
|---|---|
| H04N 21/2225 | (2011.01) |
| H04N 21/2381 | (2011.01) |
| H04N 21/438 | (2011.01) |
| H04N 21/442 | (2011.01) |
| H04N 21/61 | (2011.01) |
| H04N 21/647 | (2011.01) |
| H04L 29/06 | (2006.01) |
| H04N 7/20 | (2006.01) |

(52) U.S. Cl.
CPC ........ *H04N 21/2225* (2013.01); *H04L 65/1026* (2013.01); *H04L 65/4084* (2013.01); *H04N 7/20* (2013.01); *H04N 21/2381* (2013.01); *H04N 21/4381* (2013.01); *H04N 21/44209* (2013.01); *H04N 21/6131* (2013.01); *H04N 21/6181* (2013.01); *H04N 21/6193* (2013.01); *H04N 21/64738* (2013.01); *H04N 21/64769* (2013.01)

(58) Field of Classification Search
CPC .................... H04N 21/47202; H04N 7/17318; H04N 7/17336; H04N 21/2543; H04N 21/84; H04N 21/6587; H04N 21/812; H04N 21/6125; H04N 7/22; H04N 21/23429; H04N 21/235; H04L 29/06462
See application file for complete search history.

(56) References Cited

U.S. PATENT DOCUMENTS

| 7,420,956 B2 | 9/2008 | Karaoguz et al. | |
|---|---|---|---|
| 7,548,948 B2* | 6/2009 | Klemets | H04N 5/76 709/203 |
| 8,150,992 B2* | 4/2012 | Chapweske | H04N 7/17336 709/203 |
| 2002/0199182 A1* | 12/2002 | Whitehead | G06Q 30/04 725/1 |
| 2004/0172654 A1 | 9/2004 | Pei et al. | |
| 2005/0207336 A1* | 9/2005 | Choi | H04J 13/00 370/208 |

(Continued)

*Primary Examiner* — Ngoc Vu

(57) ABSTRACT

A video on demand (VoD) network architecture implements a gateway that provides both satellite-based communications and radio frequency-based communications. The gateway may receive a content request from a video client and determine whether the content request corresponds to a content delivery network (CDN). When the content request corresponds to the CDN, the gateway may install a VoD access point name (APN) route designated for VoD traffic between the video client and the CDN, and communicate the content request to the CDN via the VoD APN route. The VoD APN route may include a VoD APN of a wireless wide area network (WWAN) connected to the gateway via an air interface. When the content request does not correspond to the CDN, the gateway may communicate the content request via an Internet APN route.

20 Claims, 17 Drawing Sheets

(56) References Cited

U.S. PATENT DOCUMENTS

| | | |
|---|---|---|
| 2007/0223438 A1 | 9/2007 | Bennett |
| 2008/0049786 A1* | 2/2008 | Ram ............ G06F 9/5083 370/468 |
| 2008/0216142 A1 | 9/2008 | Goldberg et al. |
| 2011/0299544 A1* | 12/2011 | Lundgren ............ G06Q 20/10 370/401 |
| 2011/0320554 A1 | 12/2011 | Melander et al. |
| 2012/0066338 A1* | 3/2012 | Asarikuniyil .... H04N 21/23805 709/217 |
| 2012/0084460 A1 | 4/2012 | McGinnity et al. |
| 2012/0212575 A1* | 8/2012 | Chen ............ H04L 65/4092 348/42 |
| 2013/0103785 A1* | 4/2013 | Lyon ............ H04N 21/2385 709/217 |

* cited by examiner

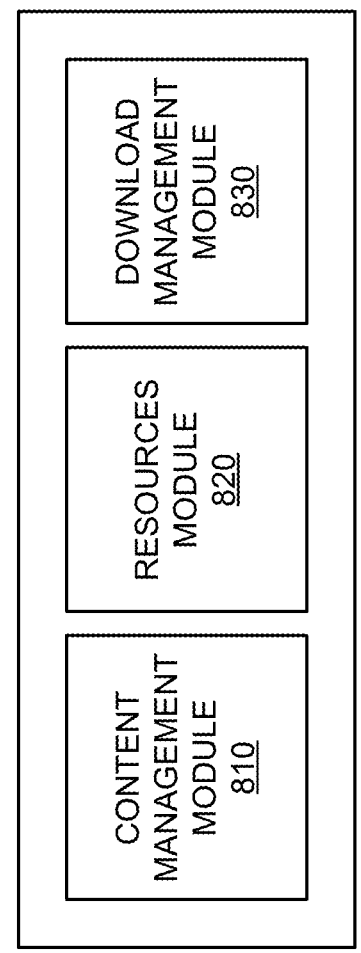

VIDEO ON DEMAND ARCHITECTURE

CROSS-REFERENCE TO RELATED APPLICATION

This application is a divisional of U.S. patent application Ser. No. 13/102,437, filed May 6, 2011, the disclosure of which is hereby incorporated herein in its entirety.

BACKGROUND

Video on demand (VoD) services have been successfully provided to households with wired connections to service providers. By contrast, households in areas without wired connections are often forced to rely on wireless services for VoD services. However, wireless services offering VoD services may suffer from one or more deficiencies, such as increased network congestion or an inability to differentiate between VoD traffic and other types of network traffic, such as Internet traffic.

BRIEF DESCRIPTION OF THE DRAWINGS

FIG. 8 is a diagram of example functional components of a content delivery network (CDN) depicted in FIGS. 1-2 of an implementation described herein;

DETAILED DESCRIPTION OF PREFERRED EMBODIMENTS

The following detailed description refers to the accompanying drawings. The same labels and/or reference numbers in different drawings may identify the same or similar elements.

An implementation, described herein, may provide a user with VoD content via wireless services. In one implementation, a video client may be capable of obtaining VoD content from a CDN. The video client may be located in a local area network (LAN), and the CDN may be located in a wide area network (WAN). Using fixed wireless services, a combined gateway may be capable of installing a VoD APN route between the LAN and the WAN, thereby enabling the video client to obtain VoD content from the CDN. The video client and the CDN may be capable of enhancing network performance by implementing network optimization techniques.

Figure 1:
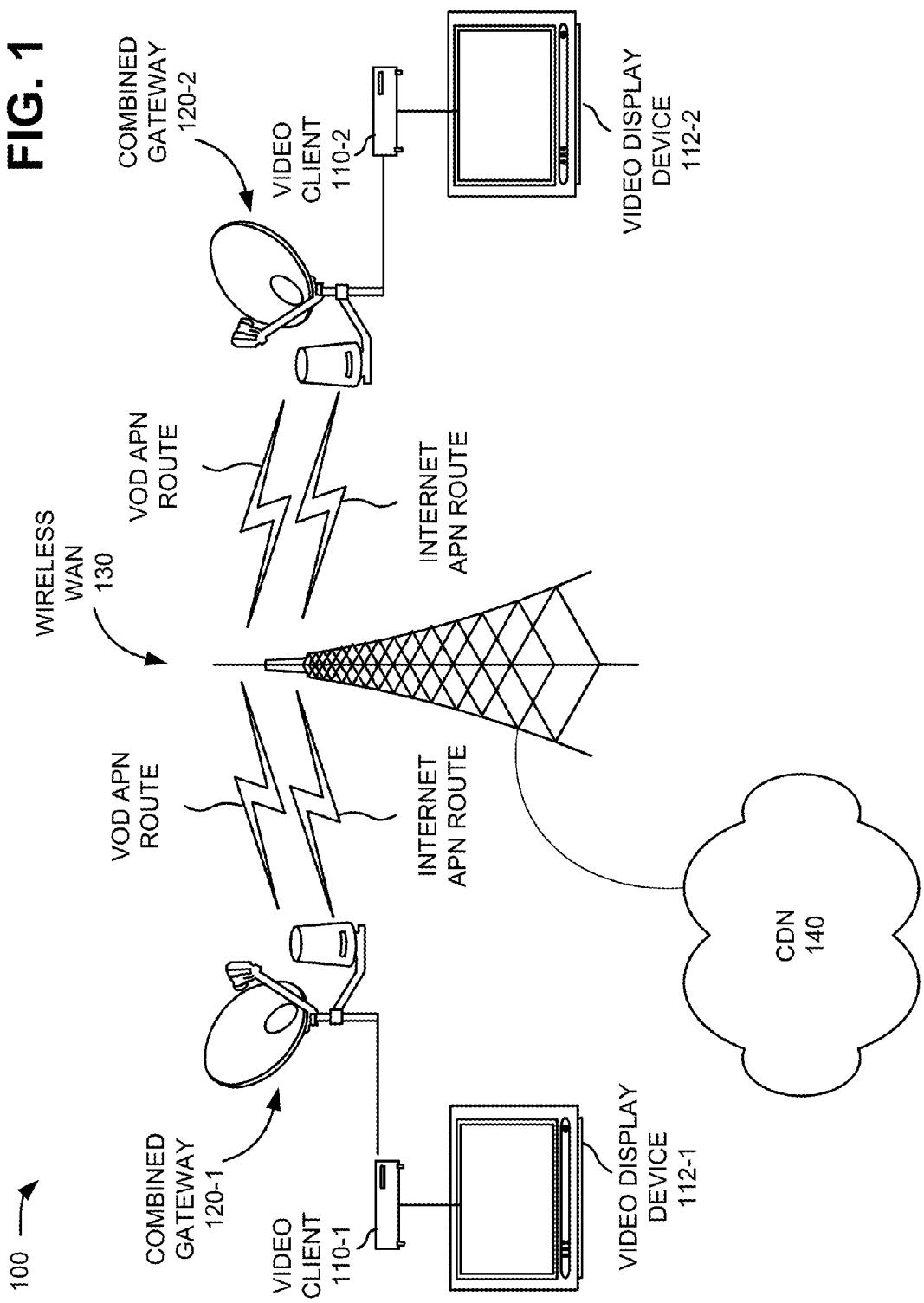
FIG. 1 is a diagram of an overview of an implementation described herein.

FIG. 1 is a diagram of an overview of an implementation described herein. As depicted, overview 100 includes video clients 110 (set-top boxes, cable cards, computers, etc.) connected to video display devices 112 (e.g., televisions, monitors, etc.), combined gateways 120, wireless WAN (WWAN) 130, and CDN 140. In some implementations, one or more of the depicted networks or devices may correspond to devices and/or components discussed elsewhere in this specification.

Video clients 110 may include one or more devices capable of receiving VoD services. For example, video clients 110 may include set-top boxes, cable cards, computers, or other devices. Video display devices 112 may include devices capable of producing audio and/or video media, including music, images, television content, or video content. Combined gateways 120 may include one or more devices capable of routing or otherwise passing data between video clients 110 and WWAN 130. In the depicted embodiment, combined gateways 120 are also capable of receiving information from one or more satellite networks (not shown) and communicating the information to video clients 110.

WWAN 130 may include one or more of a variety of networks and/or devices. For example, WWAN 130 may include one or more networks or network devices conforming to wireless standards and network architectures, such as Long-Term Evolution (LTE), Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax) or other network standards. Similarly, CDN 140 may include one or more networks and/or devices, such as a server, cluster of servers, or other devices capable of storing VoD content and/or communicating the VoD content to video clients 110 via WWAN 130 and combined gateway 120.

Generally, video clients 110 may communicate content requests to combined gateways 120. Upon receiving the content requests, combined gateways 120 may determine whether the VoD content requests correspond to CDN 140. To do so, combined gateways 120 may compare information in the VoD content requests to an address or other identifier (e.g., partial universal resource locator (URL), domain name, or Internet Protocol (IP) address) of CDN 140.

If the VoD content requests correspond to CDN 140, then combined gateways 120 may install VoD APN routes and communicate the VoD content requests to CDN 140 via WWAN 130. However, if the VoD content requests do not correspond to CDN 140, then combined gateways 120 may forward the VoD content requests over Internet APN routes. In some implementations, the use of different APN routes (e.g., a VoD APN route and/or an Internet APN route) may enable a network to, for example, monitor and bill VoD traffic in a manner that is separate and distinct from Internet traffic.

CDN 140 may respond to VoD content requests by providing VoD content to video clients 110, as requested. Additionally, or alternatively, video clients 110 and CDN 140 may be capable of cooperatively implementing network optimization techniques based on, for example, available bandwidths measured by video clients 110, viewing schedules for requested VoD content, CDN local resources, and/or overall network conditions.

For example, video client 110-1 and video client 110-2 may each communicate VoD content requests to CDN 140 at the same time. However, while video client 110-1 may indicate that the VoD content will be viewed immediately, video client 110-2 may indicate that the VoD content will be viewed at a later time. As such, if WWAN 130, for example, were experiencing a high level of congestion, CDN 140 could allocate bandwidth resources between video client 110-1 and video client 110-2 according to need. More particularly, CDN 140 could, for example, reduce a download rate allocated to video client 110-2 to better ensure that video client 110-1 can maintain an adequate bandwidth for viewing the VoD content smoothly. Later, after the congestion in WWAN 130 subsides, or video client 110-1 finishes downloading the VoD content requested, CDN 140 may reallocate download rates by increasing the download rate of video client 110-2. Accordingly, example overview 100 provides a VoD network architecture capable of managing VoD traffic and optimizing network resources to changing network conditions.

Figure 2:
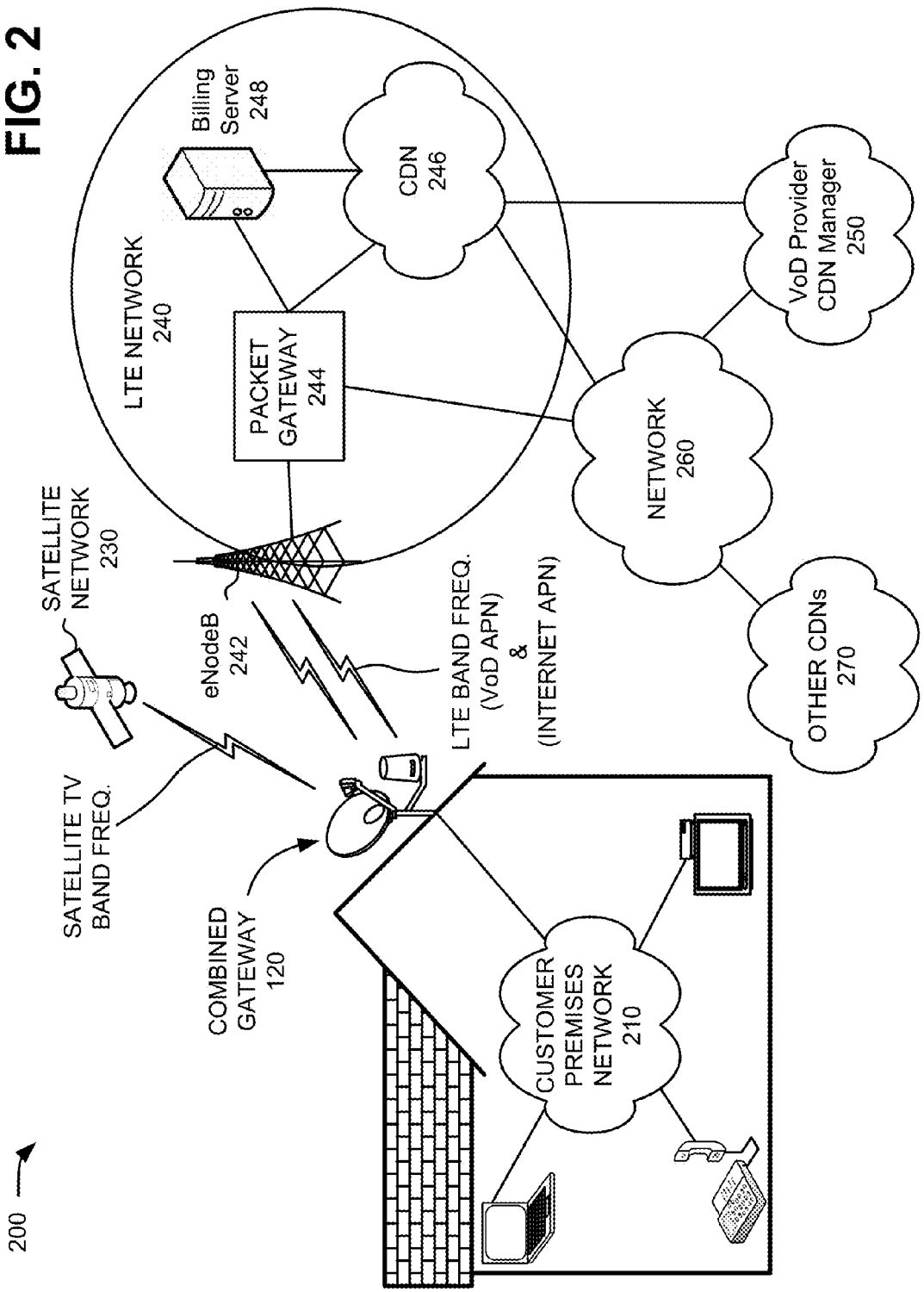
FIG. 2 is a diagram that illustrates an example environment in which systems and/or methods, described herein, may be implemented.

FIG. 2 is a diagram that illustrates an example environment 200 in which systems and/or methods, described herein, may be implemented. The depicted environment 200 includes customer premises network 210, combined gateway 120, satellite network 230, LTE network 240, VoD provider CDN manager 250, network 260, and other CDNs 270. LTE network 240 includes enhanced node B (eNodeB) 242, packet gateway 244, CDN 246, and billing server 248.

While FIG. 2 shows a particular number and arrangement of devices, in practice, environment 200 may include additional devices, fewer devices, different devices, or differently arranged devices than are shown in FIG. 2. Also, although certain connections are shown in FIG. 2, these connections are simply examples and additional or different connections may exist in practice. Each of the connections may be a wired and/or wireless connection. Further, each device may be implemented as multiple, possibly distributed, devices. Alternatively, some devices may be implemented within a single device.

Customer premises network 210 may include one or more devices connected via a LAN. As depicted, for example, customer premises network 210 may include video clients, video display devices, computers, voice-over-Internet-protocol (VoIP) devices, home networking equipment (e.g., routers, cables, splitters and/or local gateways) and/or gaming devices. Devices within customer premises network 210 may be connected via one or more wired connections (e.g., coaxial cable, Telecommunications Industry Association (TIA) category 5 ("Cat 5") cable, TIA Cat 3 cable or any other wired connections) and/or wireless connections (e.g., network devices such as those available under the IEEE 802.11 wireless LAN standards, WiFi, RF, Bluetooth, etc.). Customer premises network 210 is connected to eNodeB 242 through a two-way wireless connection (e.g., using a LTE band frequency) and connected to satellite network 230 through a one-way (e.g., downlink) wireless connection (e.g., using a satellite TV band frequency). The two-way wireless connection and the one-way wireless connection may be implemented using combined gateway 120, and combined gateway 120 may be capable of communicating with eNodeB 242 via a VoD APN route and an Internet APN route.

Combined gateway 120, which is described in more detail below, may generally include mechanisms for communicating with satellite network 230 (to provide satellite-based communications) and for communicating with eNodeB 242 (to provide terrestrial RF-based communications). Communications from satellite network 230 may be received by a satellite antenna in combined gateway 120, while communications from/to eNodeB 242 may be received/sent by an outdoor broadband unit of combined gateway 120. Combined gateway 120 may connect to devices in customer premises network 210, via, for example, a coaxial connection.

LTE network 240 may include a core network architecture of the Third Generation Partnership Project (3GPP) LTE wireless communication standard (e.g., an evolved packet core (EPC) network). LTE network 240 may include a packet-switched core network that supports high-speed wireless and wireline broadband access technologies. Additionally, LTE network 240 may provide packet-switched voice services (e.g., which are traditionally circuit-switched) using an Internet Protocol Multimedia Subsystem Multimedia Subsystem (IMS) network (not shown)). In addition, LTE network 240 may include one or more other network devices, such as one or more mobility management entities (MMEs), serving gateways (SGWs), packet gateways 244, billing servers 248, and/or other devices.

Packet gateway 244 may be capable of separately monitoring network traffic corresponding to VoD services and Internet services. Billing server 248 may be capable of generating invoices that account for VoD traffic and Internet traffic separately. CDN 246, VoD provider CDN manager 250, and other CDNs 270 may each include a server, cluster of servers, and/or one or more memories. CDN 246 and other CDNs 270 may store VoD content, including movies, TV episodes, and/or other audio or visual media. CDN 246 may participate or otherwise engage in one or more network optimization techniques discussed herein. In some implementations, CDN 246 may include CDN servers at different geographical locations in LTE network 240. Each of these CDN servers may store redundant or non-redundant VoD content. CDN 246 may be capable of selecting a particular CDN or CDN device (e.g., CDN server) for providing VoD content based on, for example, a proximity of the CDN server to a video client requesting VoD content. By contrast, while VoD content may be available from other CDNs 270, other CDNs 270, in some implementations, might not engage in one or more of the network optimization techniques discussed herein. VoD provider CDN manager 250 may operate, for example, to manage VoD content stored in CDN 246 and/or other CDNs 270.

eNodeB 242 may include an LTE base station that may cover a particular geographic area serviced by LTE network 240. eNodeB 242 may include one or more devices that receive information, such as audio, video, text, and/or other data, from network devices and/or devices that transmit the information to customer premises network 210 via an air interface. eNodeB 242 may also include one or more devices that receive information from devices in customer premises network 210 via an air interface and/or interface that transmits the information to other network devices.

Satellite network 230 may provide multimedia content from, for example, a direct broadcast satellite (DBS) service provider (not shown in FIG. 2). Satellite network 230 may provide a downlink signal over a designated satellite TV band frequency (e.g., in the range of 950 megahertz (MHz) to 2150 MHz). The downlink signal may be received using a satellite antenna/receiver system at customer premises network 210 to present satellite TV content to a user.

Network 260 may include a LAN, a WAN, a metropolitan area network (MAN), a telephone network, such as the Public Switched Telephone Network (PSTN), a cellular network, a Wi-Fi network, an intranet, the Internet, an optical fiber (or fiber optic)-based network, or a combination of these or other types of networks. While implementations herein are described primarily in the context of broadband services via LTE, other wireless protocols may be used. For example, components conforming to LTE standards described herein may be replaced by components conforming to other network protocols (e.g., GSM, WCDMA, UMB, UMTS, CDMA2000, HSPA, WiMax or other network protocols).

Although FIG. 2 shows example components of environment 200, in other implementations, environment 200 may include fewer components, different components, differently arranged components, and/or additional components than those depicted in FIG. 2. Alternatively, or additionally, one or more components of environment 200 may perform one or more tasks described as being performed by one or more other components of environment 200.

For example, environment 200 may also include a network operations center (not shown) with one or more devices (e.g., server devices) from which administrators may supervise, monitor, and/or maintain environment 200. For example, a network operations center may be responsible for analyzing problems in the environment (including issues with video clients in customer premises network 210, combined gateway 120, and/or CDN 246), performing troubleshooting, communicating with site technicians and other network operations centers, and/or tracking problems through to resolution. A network operations center may connect to LTE network 240 via wired or wireless connections.

Figure 3:
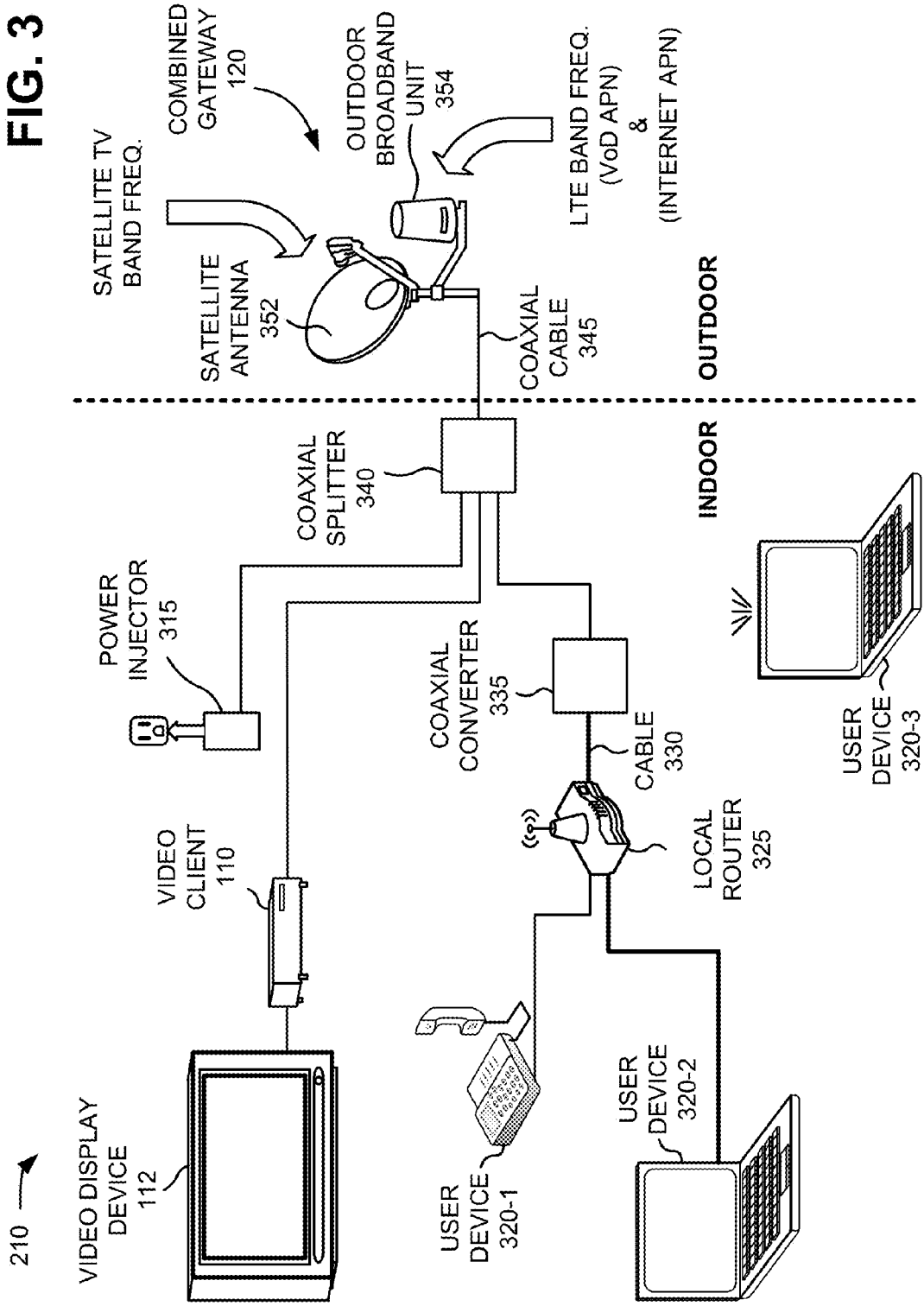
FIG. 3 is a diagram of a customer premises network of FIG. 2 according to an implementation described herein.

FIG. 3 is a diagram of customer premises network 210 according to one or more implementations described herein. As depicted, customer premises network 210 includes video display device 112, video client 110, power injector 315, user devices 320, local router 325, cable 330, coaxial converter 335, coaxial splitter 340, coaxial cable 345, and combined gateway 120 with satellite antenna 352 and outdoor broadband unit 354. For simplicity, customer premises network 210 has been limited to the foregoing features and devices. In practice, however, there may be more (or fewer) outdoor broadband units 354, satellite antennas 352, coaxial splitters 340, power injectors 315, video clients 110, video display devices 112, coaxial converters 335, local routers 325, and/or user devices 320. Also, in some implementations, the features and devices of customer premises network 210 may correspond to one or more networks or devices discussed elsewhere in this specification, including customer premises network 210 of FIG. 2.

Outdoor broadband unit 354 may include one or more data processing and/or data transfer devices, such as a gateway, a router, a modem, a switch, a firewall, a network interface card, a hub, a bridge, a proxy server, an optical add-drop multiplexer (OADM), and/or some other type of device that processes and/or transfers data. In one example, outdoor broadband unit 354 may include a wireless gateway that provides a convergence point between wireless protocols (e.g., associated with eNodeB 242) and IP protocols (e.g., associated with user devices 320). Outdoor broadband unit 354 may be physically deployed with satellite antenna 352 (e.g., on a roof or a side wall of a house associated with customer premises network 210) as part of combined gateway 120. For example, outdoor broadband unit 354 may utilize a pre-existing or new satellite TV installation in a way that both broadband (over LTE) service and satellite TV are brought indoors (e.g., inside the customer's premises) over, for example, coaxial cable 345. Additionally, or alternatively, outdoor broadband unit 354 may be a Technical Report 069 (TR-069) enabled device to support CPE WAN Management Protocol (CWMP) and URL/IP address configuration for VoD. Components of outdoor broadband unit 354 may also be powered using coaxial cable 345.

Satellite antenna 352 may provide an interface for television service broadcast from satellites. In one implementation, satellite antenna 352 may provide an entry point for a network (e.g., customer premises network 210) that conforms to standards of the Multimedia over Coaxial Alliance (MoCA). Generally, MoCA-compliant devices may be used to implement a home network on existing coaxial cable, using, for example, orthogonal frequency-division multiplexing (OFDM) modulation that divides data into several parallel data streams or logical channels. Channel stacking technology, such as the Single Wire Multiswitch (SWiM) technology, may be used to allocate logical channels using frequency blocks for user-selected programming to the SWiM compatible devices (e.g., video clients 110). Satellite antenna 352 may communicate with video client 110 to identify which blocks of channels can be used to send television signals to that particular video client 110.

Coaxial splitter 340 may include splitting technologies to filter LTE and satellite TV signals. In one implementation, coaxial splitter 340 may include a SWiM splitter. For example, coaxial splitter 340 may facilitate allocating logical channels using different frequency blocks for viewer-selected television programming and broadband signals to SWiM-compatible video client 110 and/or local router 325.

Power injector 315 may include a mechanism for injecting DC power in a coaxial cable to power remotely-located devices, such as outdoor broadband unit 354. Use of power injector 315 may allow components of outdoor broadband unit 354 to be powered via a coaxial cable (e.g., coaxial cable 345) and eliminate the need for additional wiring. In one implementation, power injector 315 may include an on-off switch (or button).

Video client 110 may include a device that receives and/or processes video content (e.g., from a satellite TV provider via satellite antenna 352), and provides the video content to video display device 112 or another device. As mentioned above, video client 110 may include a STB, cable card, computer, and/or another type of device. Video client 110 may also include decoding and/or decryption capabilities and may further include a digital video recorder (DVR) (e.g., a hard drive). Video client 110 may request and receive services, including VoD content. In one implementation, video client 110 may conform to MoCA and SWiM standards.

Video display device 112 may include a television monitor capable of displaying video content, television programming, content provided by video client 110, and/or content provided by other devices (e.g., a digital video disk (DVD) player or a video camera, not shown) connected to video display device 112. Coaxial converter 335 may include a device to convert incoming signals from coaxial cables to outgoing signals on cable 330.

Local router 325 may include a device that provides connectivity between equipment within customer premises network 210 (e.g., user devices 320) and between the customer premises equipment and an external network (e.g., LTE network 240). In one implementation, local router 325 may include a wireless access point that employs one or more short-range wireless communication protocols for a wireless personal area network (WPAN) and/or a wireless local area network (WLAN), such as, for example, IEEE 802.15 (e.g., Bluetooth) and IEEE 802.11 (e.g., WiFi). In other implementations, different short-range wireless protocols and/or frequencies may be used. Local router 325 may also include one or more wired (e.g., Ethernet) connections. In one implementation, local router 325 may include a USB Ethernet Router that is capable of meeting LTE quality of service (QoS) standards.

User devices 320 may include any device that is capable of communicating with customer premises network 210 (see, FIG. 2) via local router 325. For example, user device 320 may include a mobile computation and/or communication device, such as a laptop computer, a VoIP-enabled device, a radiotelephone, a personal communications system (PCS) terminal (e.g., that may combine a cellular radiotelephone with data processing and data communications capabilities), a personal digital assistant (PDA) (e.g., that can include a radiotelephone, a pager and/or Internet/intranet access), a wireless device, a smart phone, a global positioning system (GPS) device or a content recording device (e.g., a camera and/or video camera). In another example, user devices 320 may include a fixed (e.g., provided in a particular location, such as within a customer's home) computation and/or communication device, such as a VoIP-enabled device phone base, a personal computer, and/or a gaming system.

As mentioned above, although FIG. 3 shows example components of customer premises network 210, in other implementations, customer premises network 210 may include fewer components, different components, differently arranged components, and/or additional components than those depicted in FIG. 3. Alternatively, or additionally, one or more components of customer premises network 210 may perform one or more tasks described as being performed by one or more other components of customer premises network 210.

Figure 4:
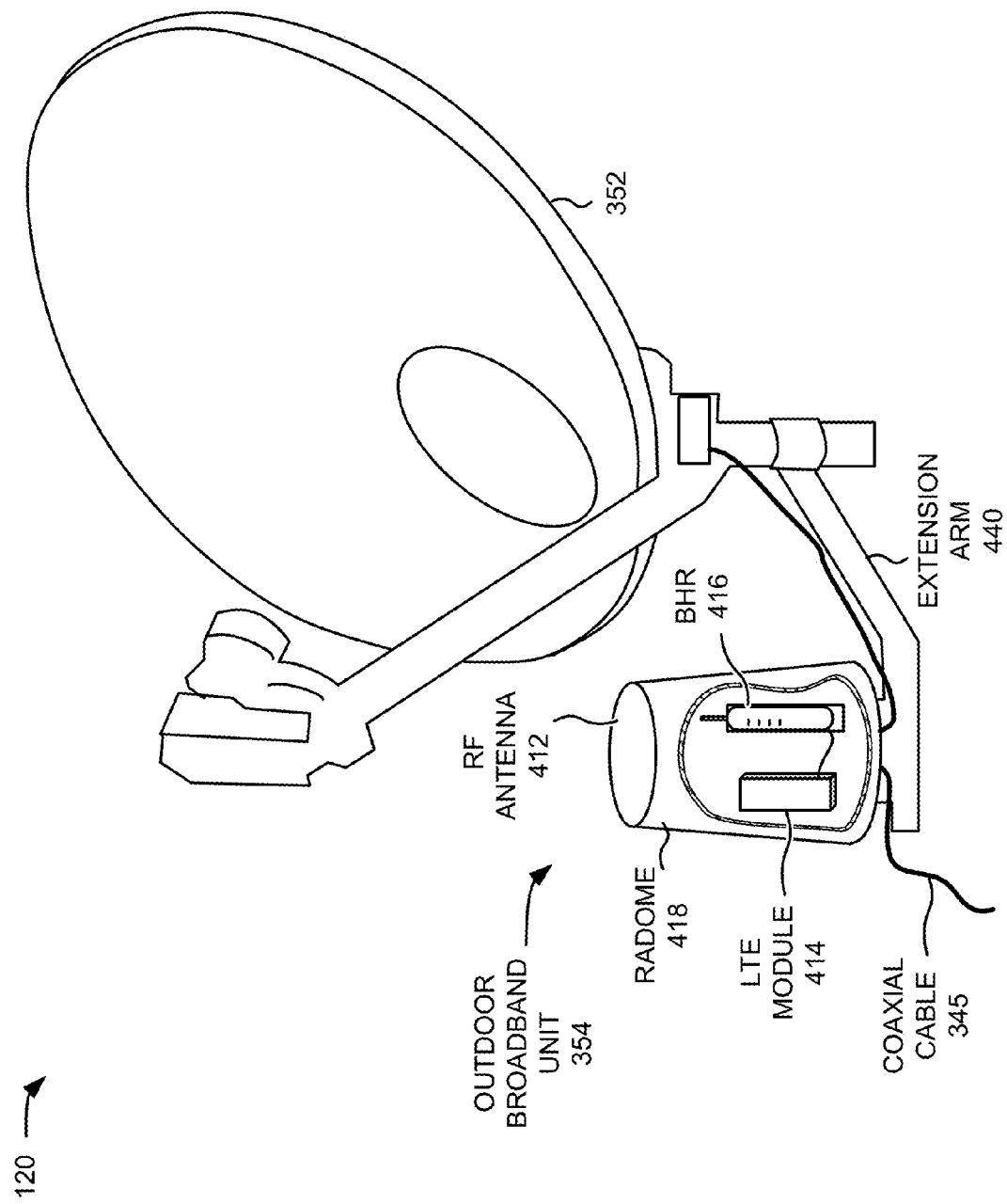
FIG. 4 is a diagram of example components of a combined gateway depicted in FIGS. 1-3 according to an implementation described herein.

FIG. 4 is a diagram of example components of combined gateway 120. As illustrated, combined gateway 120 may include outdoor broadband unit 354 and satellite antenna 352. Outdoor broadband unit 354 and satellite antenna 352 may include features described above in connection with, for example, FIGS. 1-3. Outdoor broadband unit 354 may include radio frequency (RF) antenna 412, LTE module 414, and broadband home router (BHR) 416, which all may be housed in radome 418. In one implementation, as shown in FIG. 4, outdoor broadband unit 354 may be connected to coaxial cable 345 and mounted on extension arm 440 connected to a structure (e.g., an arm or a pole) supporting satellite antenna 352.

RF antenna 412 may include an antenna to transmit and/or receive RF signals over the air. RF antenna 412 may, for example, receive RF signals from LTE module 414/BHR 416 and transmit the RF signals over the air. RF antenna 412 may, for example, receive RF signals over the air and provide them to LTE module 414/BHR 416. In one implementation, for example, LTE module 414/BHR 416 may communicate with a base station (e.g., eNodeB 242) connected to a network (e.g., LTE network 240) to send and/or receive signals from user devices 320. In implementations herein, RF antenna 412 may be enclosed by radome 418, integrated with radome 418, or external to radome 418. While one RF antenna 412 is shown in FIG. 4, outdoor broadband unit 354 may include more than one antenna in other implementations.

In one implementation, RF antenna 412 may include a wideband multiple beam antenna, with partially overlapping antenna beams, spanning 360 degrees in azimuth (x-y plane). For example, RF antenna 412 may include between four and eight beams to achieve desirable antenna gains and reduction of interference. Additionally, or alternatively, RF antenna 412 may employ two polarizations per beam for 2×2 downlink multiple-input and multiple-output (MIMO) operation.

In another implementation, RF antenna 412 may include a fixed dually-polarized directional antenna. As a directional antenna, RF antenna 412 may use polarizations matched to the polarizations of a particular base station (e.g., eNodeB 242). For example, a polarization of RF antenna 412 may match a polarization of a serving eNodeB 242 or base station. Antenna pointing for the directional antenna may be conducted, for example, during installation of outdoor broadband unit 354.

LTE module 414 may include a device (e.g., a modem) with communication capability via an air interface. For example, LTE module 414 may receive broadband signals and/or voice VoIP signals from eNodeB 242 (e.g., via RF antenna 412) and may transmit broadband signals and/or VoIP signals to eNodeB 242 (e.g., via RF antenna 412). LTE module 414 may employ frequency division duplex (FDD) and/or time division duplex (TDD) techniques to facilitate downlink and uplink transmissions. In one implementation, LTE module 414 may include a beam selection mechanism that selects the best antenna beam from RF antenna 412, according to a certain optimization criteria. Beam selection may be performed, for example, during initial installation and/or regular maintenance of outdoor broadband unit 354. Additionally, or alternatively, LTE module 414 may select any of the RF antenna 412 beams, based on real-time measurements, during normal operation.

BHR 416 may include a device for buffering and forwarding data packets toward destinations. For example, BHR 416 may receive data packets from eNodeB 242 (e.g., via LTE module 414) and may forward the data packets toward user devices (not shown). In addition, BHR 416 may receive data packets from user devices (e.g., via local router 325) and may forward the data packets toward recipient devices (e.g., CDN 246, a VoD Provider CDN Manager 250, and/or other CDNs 270) via LTE network 240.

In one example implementation, BHR 416 may be associated with a coaxial network controller (not shown) that provides an interface for Ethernet over coaxial signals, such as signals transmitted over coaxial cable 345 and into customer premises network 210. A coaxial network controller may act as a bridge device to receive signals from LTE module 414 via a wired USB connection and to convert the signals to an Ethernet over coaxial signal. The Ethernet over coaxial signal may be assigned a logical channel (e.g., according to SWiM guidelines) and may be combined with coaxial input from satellite antenna 352. In one implementation, the output from coaxial network controller may be inserted in a Mid-RF MoCA channel that is separate from the 950 MHz to 2150 MHz range of a typical satellite TV system.

Radome 418 (shown with a cut-away view to reveal LTE module 414 and BHR 416) may provide a weatherproof enclosure to protect RF antenna 412, LTE module 414, BHR 416, and/or other components of outdoor broadband unit 354. Generally, radome 418 may include any RF transparent or substantially RF transparent structure (e.g., a cover) that protects components in an outdoor environment.

Combined gateway 120 may be integrated with the SWiM environment associated with satellite antenna 352 to provide both TV service and broadband wireless service. With this architecture, combined gateway 120 may require only one coaxial line leading from outdoor broadband unit 354/satellite antenna 352. This single coaxial line may feed the in-home coaxial installation to deliver satellite TV service and LTE service to corresponding video clients 110 and user devices 320 (e.g., as shown in FIG. 2). Components of outdoor broadband unit 354, such as the RF antenna 412, LTE module 414 and/or BHR 416, may be powered using coaxial cable 345.

Although FIG. 4 shows example components of combined gateway 120, in other implementations, combined gateway 120 may contain fewer components, different components, differently arranged components, and/or additional components than depicted in FIG. 4. Alternatively, or additionally, one or more components of combined gateway 120 may perform one or more other tasks described as being performed by one or more other components of combined gateway 120. In one alternative implementation, one or more functions of combined gateway 120 may be moved to another location, such as internal to customer premises network 210. For example, a bridge may be installed in combined gateway 120 instead of BHR 416. The bridge may function to combine coaxial input from satellite antenna 352 with the output from the LTE module 414 into a single coaxial line, which may be forwarded to a broadband router that is installed inside customer premises network 210.

Figure 5:
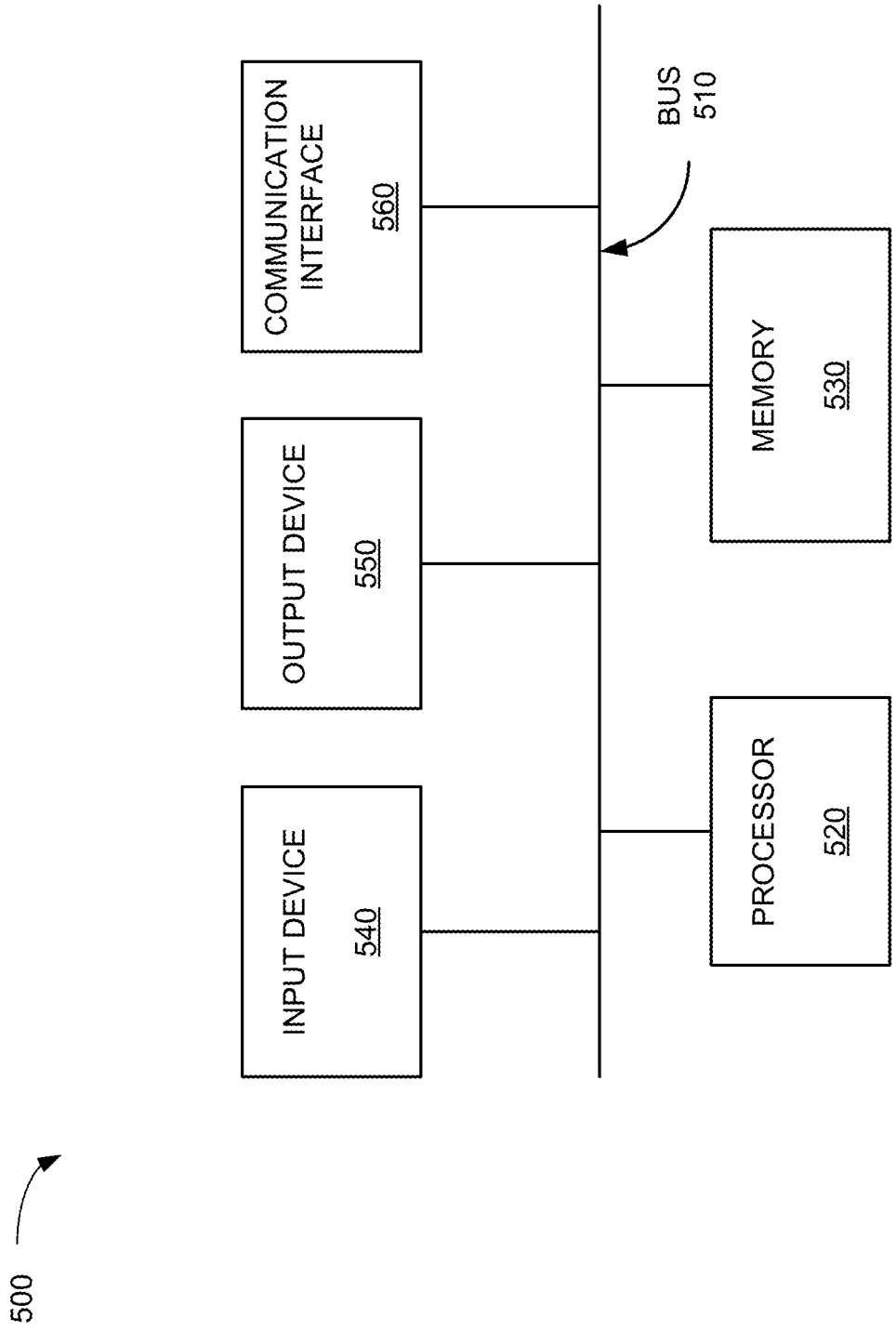
FIG. 5 is a diagram of example components of one or more devices that may be used within the environment of FIG. 2.

FIG. 5 is a diagram of example components of device 500 that may correspond to one or more of the devices of environment 200 and/or customer premises network 210 (e.g., CDN 246, VoD provider CDN manager 250, other CDNs 270, video clients 110, LTE module 414 and/or BHR 416). Each of CDN 246, VoD provider CDN manager 250, other CDNs 270, video clients 110, LTE module 414, and/or BHR 416 may include one or more devices 500 or one or more of each of the components of device 500.

As depicted, device 500 includes bus 510, processor 520, memory 530, input device 540, output device 550, and communication interface 560. Device 500 may include fewer, additional, different, or differently arranged components than those illustrated in FIG. 5. Bus 510 may permit communication among the components of device 500. Processor 520 may include one or more processors, microprocessors, data processors, co-processors, network processors, application-specific integrated circuits (ASICs), controllers, programmable logic devices (PLDs), chipsets, field-programmable gate arrays (FPGAs), or other components that may interpret or execute instructions or data. Processor 520 may control the overall operation, or a portion thereof, of device 500, based on, for example, an operating system (not illustrated) and/or various applications. Processor 520 may access instructions from memory 530, from other components of device 500 or from a source external to device 500 (e.g., a network or another device).

Memory 530 may include memory or secondary storage. For example, memory 530 may include a RAM, a dynamic RAM (DRAM), a read-only memory (ROM), a programmable ROM (PROM), a flash memory or some other type of memory. Memory 530 may include a hard disk (e.g., a magnetic disk, an optical disk, a magneto-optic disk, a solid state disk, etc.) or some other type of computer-readable medium, along with a corresponding drive.

Memory 530 may store data, applications or instructions related to the operation of device 500. For example, memory 530 may include a variety of applications, such as a navigation application, an e-mail application, a telephone application, a camera application, a voice recognition application, a multi-media application, a music player application, a visual voicemail application, a contacts application, a data organizer application, a calendar application, an instant messaging application, a texting application, a web browsing application, a blogging application or other types of applications (e.g., a word processing application or a spreadsheet application).

Input device 540 may include a component that permits a user or another device to input information into device 500. For example, input device 540 may include a keypad, a button, a switch, a knob, fingerprint recognition logic, retinal scan logic, a web cam, voice recognition logic, a touchpad, an input port, a microphone, a display or some other type of input component. Output device 550 may include a component that permits device 500 to output information to the user or another device. For example, output device 550 may include a display, light-emitting diodes (LEDs), an output port, a speaker or some other type of output component.

Communication interface 560 may include one or more transceiver-like mechanisms that enable device 500 to communicate with other devices, systems, or networks. For example, communication interface 560 may include mechanisms for communicating with other devices, such as other devices of environment 200 or customer premises network 210.

As described herein, device 500 may perform certain operations in response to processor 520 executing software instructions contained in a computer-readable medium, such as memory 530. A computer-readable medium may be defined as a non-transitory memory device. A memory device may include space within a single physical memory device or spread across multiple physical memory devices. The software instructions may be read into memory 530 from another computer-readable medium or from another device via communication interface 560. The software instructions contained in memory 530 may cause processor 520 to perform processes described herein. Alternatively, hardwired circuitry may be used in place of, or in combination with, software instructions to implement processes described herein. Thus, implementations described herein are not limited to any specific combination of hardware circuitry and software.

Although FIG. 5 shows example components of device 500, in other implementations, device 500 may contain fewer components, different components, differently arranged components, or additional components than those depicted in FIG. 5. Alternatively, or additionally, one or more components of device 500 may perform one or more other tasks described as being performed by one or more other components of device 500.

Figure 6:
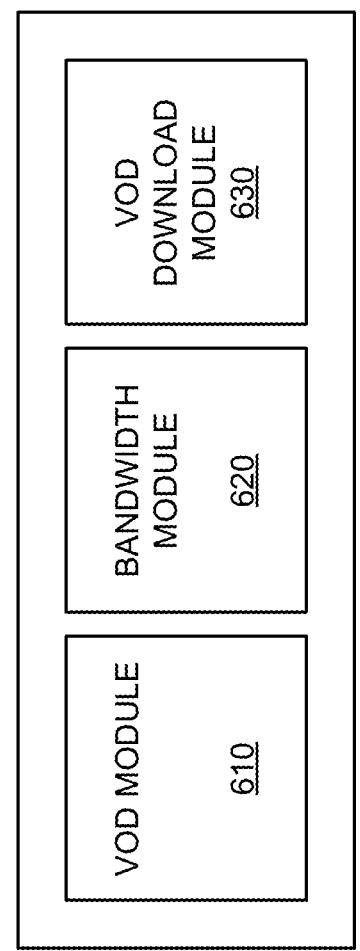
FIG. 6 is a diagram of example functional components of a video client depicted in FIGS. 1-3 according to an implementation described herein.

FIG. 6 is a diagram of example functional components of video client 110. As depicted, video client 110 may include VoD module 610, bandwidth module 620, and VoD download module 630. In some implementations, the functions described in connection with FIG. 6 may be performed by one or more components of device 500 (FIG. 5) or one or more devices 500.

VoD module 610 may provide functionality relating to VoD services. For instance, VoD module 610 may operate to enable a user to view, browse, preview, or request VoD content via a graphical user interface (GUI). In certain implementations, VoD module 610 may also enable a user to decide whether to view VoD content immediately or download VoD content in advance, which may include providing a user with an option to input viewing schedule information, such as dates or times, for viewing VoD content. In some implementations, VoD module 610 may also operate to communicate with, for example, CDN 246, other CDNs 270, or VoD provider CDN manager 250.

Bandwidth module 620 may provide functionality relating to bandwidth operations. For example, bandwidth module 620 may operate to periodically measure an available bandwidth and/or notify CDN 246 of available bandwidth. Additionally, or alternatively, bandwidth module 620 may operate to compare a current download rate with an available bandwidth. Bandwidth module 620 may also, or alternatively, request that a download rate, corresponding to video client 110, be increased.

VoD download module 630 may provide functionality relating to VoD download operations. For example, VoD download module 630 may establish and maintain a connection with CDN 246 or other CDNs 270. Additionally, or alternatively, VoD download module 630 may monitor a download operation (e.g., a download of requested VoD content), determine when the download operation is complete, and/or close a connection corresponding to the download operation. In some implementations, VoD download module 630 may also, or alternatively, pause and resume download operations in response to, for example, a pause download command from CDN 246. In certain implementations, VoD download module 630 may specify an appropriate buffer size based on an available bandwidth or download rate, monitor the buffer during a download operation, and/or communicate requests or notifications to, for example, CDN 246 based on the status of the buffer.

Although FIG. 6 shows example functional components of video client 110, in other implementations, video client 110 may include fewer functional components, different functional components, differently arranged functional components, or additional functional components than those depicted in FIG. 6. Alternatively, or additionally, one or more functional components of video client 110 may perform one or more other tasks described as being performed by one or more other functional components of video client 110.

Figure 7:
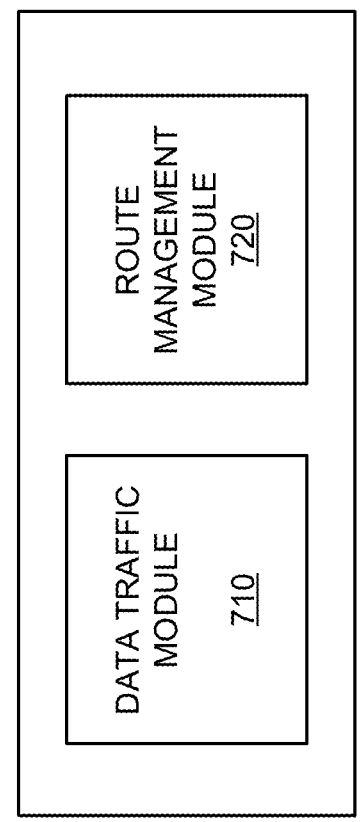
FIG. 7 is a diagram of example functional components of a combined gateway depicted in FIGS. 1-3 according to an implementation described herein.

FIG. 7 is a diagram of example functional components of outdoor broadband unit 354. As depicted, outdoor broadband unit 354 may include data traffic module 710 and route management module 720. In one implementation, the functions described in connection with FIG. 7 may be performed by one or more components of device 500 (FIG. 5) or one or more devices 500.

Data traffic module 710 may provide functionality relating to VoD traffic and Internet traffic. For example, data traffic module 710 may receive a content request (e.g., an HttpGetUrl message) from video client 110 and determine whether the content request corresponds to CDN 246 or other CDNs 270. In some implementations, data traffic module 710 may do so by identifying and/or processing content request information (e.g., information in a content request) and comparing the content request information with information associated with CDN 246 or other CDNs 270. Additionally, or alternatively, data traffic module 710 may rely on partial URLs, domain names, and/or IP addresses to determine whether the content request corresponds to CDN 246 or other CDNs 270. In some implementations, data traffic module 710 may communicate with video client 110 via a LAN interface (not shown) and CDN 246 or other CDNs 270 via a WWAN interface.

Route management module 720 may provide functionality relating to VoD APN routes and Internet APN routes. For example, route management module 720 may install a VoD APN route in response to data traffic module 710 receiving a content message corresponding to CDN 246 or other CDNs 270. Additionally, or alternatively, route management module 720 may create and/or maintain an Internet APN route for requests, messages, or other information that does not correspond to CDN 246 or other CDNs 270. In certain implementations, a VoD APN route may include a data routing path designated for VoD traffic between video client 110 and CDN 246 or other CDNs 270, including an appropriate source IP (e.g., SrcIP), destination IP (DstIP), APN information (e.g., network identifier), or other networking parameters.

Route management module 720 may also, or alternatively, monitor a VoD APN route. In some implementations, route management module 720 may intercept messages, redirect messages, and/or determine whether a VoD APN route is still in use. Route management module 720 may update or otherwise maintain one or more routes, including VoD APN routes. For instance, route management module 720 may modify an existing VoD APN route or create a new VoD APN route in accordance with a redirect message from CDN 246 or other CDNs 270. Route management module 720 may also, or alternatively, remove or uninstall VoD APN routes that are no longer in use.

Although FIG. 7 shows example functional components of outdoor broadband unit 354, in other implementations, outdoor broadband unit 354 may include fewer functional components, different functional components, differently arranged functional components, or additional functional components than those depicted in FIG. 7. Alternatively, or additionally, one or more functional components of outdoor broadband unit 354 may perform one or more other tasks described as being performed by one or more other functional components of outdoor broadband unit 354.

FIG. 8 is a diagram of example functional components of CDN 246. As depicted, CDN 246 may include content management module 810, resources module 820, and download management module 830. In one implementation, the functions described in connection with FIG. 8 may be performed by one or more components of device 500 (FIG. 5) or one or more devices 500.

Content management module 810 may provide functionality relating to the management of VoD content. For example, content management module 810 may maintain and provide access to stored VoD content. Content management module 810 may provide video clients 110 with information regarding currently available VoD content. Additionally, or alternatively, content management module 810 may communicate with VoD content sources (e.g., CDN 246 or other CDNs 270) to, for example, locate, distribute and/or redistribute VoD content. Content management module 810 may also, or alternatively, communicate with VoD provider CDN manager 250 to, for example, inform the VoD provider CDN manager 250 about stored VoD content and/or current locations of VoD content.

Resources module 820 may provide functionality regarding the management and allocation of network resources. Resources module 820 may operate to receive bandwidth availability messages from video clients 110 and/or evaluate network conditions. In some implementations, resources module 820 may determine a level of network congestion corresponding to one or more portions of a WAN or WWAN 130. This may include, for example, measuring network latency or determining a turnaround time of one or more packets or messages. Resources module 820 may also, or alternatively, evaluate local resources to determine whether there are adequate resources to provide video client 110 with VoD content. In some implementations, network resources module 820 may cooperate with content management module 810 to identify alternative CDNs or CDN devices for providing VoD content requested by video client 110.

Download management module 830 may provide functionality regarding VoD content downloads. In some implementations, download management module 830 may receive VoD content requests from video clients 110 and respond by providing video clients 110 with the VoD content requested. In certain implementations, download management module 830 may cooperate with network resources module 820 to determine an appropriate download rate for VoD content.

Additionally, or alternatively, download management module 830 may cooperate with network resources module 820 to increase download rates, decrease download rates, pause downloads, and/or resume downloads, depending on, for example, network conditions or currently available local resources. Download management module 830 may monitor and maintain a record of a variety of data, including previous downloads, current downloads, download rates, video clients 110, viewing schedules, or other information relating to VoD content downloads.

Although FIG. 8 shows example functional components of CDN 246, in other implementations, CDN 246 may include fewer functional components, different functional components, differently arranged functional components, or additional functional components than those depicted in FIG. 8. Alternatively, or additionally, one or more functional components of CDN 246 may perform one or more other tasks described as being performed by one or more other functional components of CDN 246.

Figure 9A:
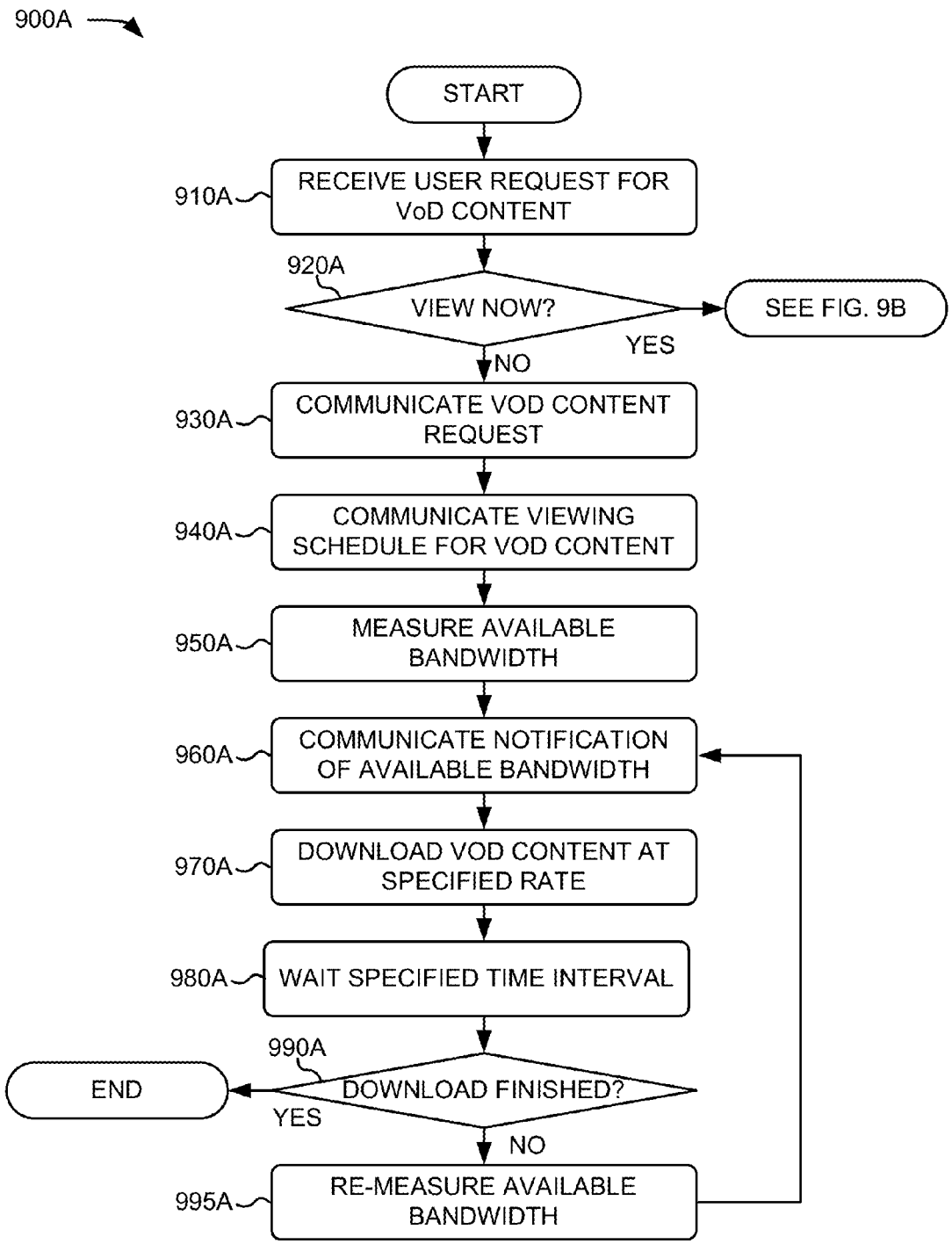
FIGS. 9A-9B are flowcharts of an example process for downloading VoD content.
Figure 9B:
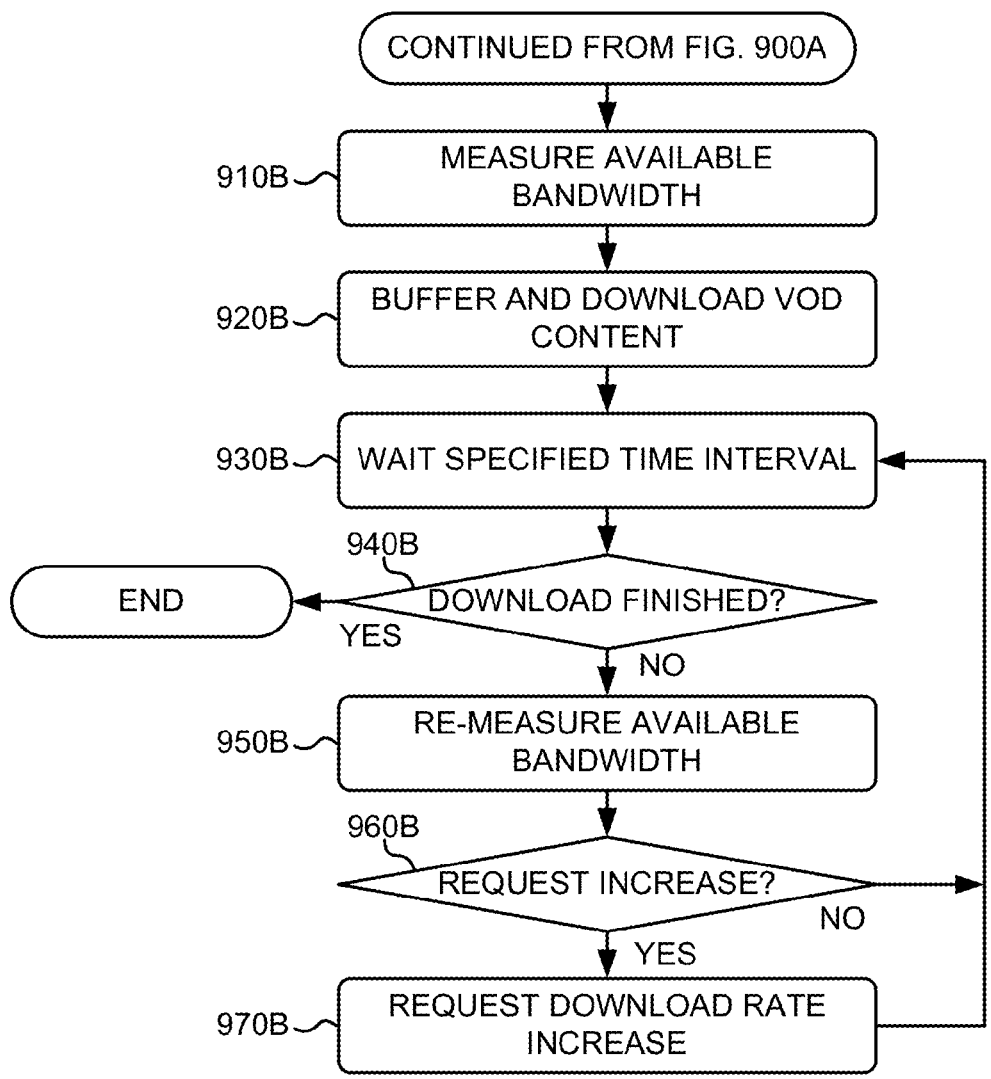

FIGS. 9A-9B are flowcharts of an example process 900 (referring to both 900A and 900B) for downloading VoD content. Due to the size of process 900, a first portion of process 900 is described with reference to FIG. 9A, and a second portion of process 900 is described with reference to FIG. 9B. In one or more implementations, process 900 may be performed by one or more components, modules, or devices of video client 110. In other implementations, one or more blocks of process 900 may be performed by one or more other components, modules, or devices, or a group of components, modules, or devices, including or excluding the components, modules, or devices of video client 110.

Process 900A may include receiving a user request for VoD content (block 910A). For example, video client 110 may receive a request for VoD content from a user. In some implementations, the user may communicate the request using a remote control, button-based interface, touch screen device, mobile device, or any variety of other user interface components or devices.

Process 900A may also include determining a viewing schedule (block 920A). In some implementations, a viewing schedule may specify when the user would like to view the VoD content. In certain implementations, determining a viewing schedule may include providing the user with a GUI that prompts the user to select a viewing schedule option, such as "view now" or "view later." In some implementations, a GUI may also, or alternatively, provide the user more complete and/or detailed scheduling options, such as options to create a queue of VoD content to download or options to designate one or more dates or times for viewing VoD content.

If a selection is made to view the VoD content later (block 920A—No), process 900A may include communicating a VoD content request (block 930A). For example, in some implementations, video client 110 may send a request for VoD content to CDN 246 or other CDNs 270. However, in other implementations, video client 110 may communicate an initial request for VoD services to VoD provider CDN manager 250 and receive a VoD content URL in response to the initial request for VoD services. Video client 110 may also, or alternatively, generate an HttpGetUrl message using the VoD content URL and/or communicate the HttpGetUrl message to CDN 246 or other CDNs 270 via combined gateway 120 (this will be described in more detail with respect to FIG. 15).

Similarly, process 900A may include communicating a viewing schedule for VoD content (block 940A). In certain implementations, video client 110 may inform CDN 246 of a user's intention to view VoD content at a later time. Additionally, a measurement may be taken of the available bandwidth (block 950A). For example video client 110 may measure a bandwidth or potential download rate currently available to video client 110. In some implementations, the available bandwidth may be measured by measuring network latency, packet turnaround times, executing one or more ping operations, acquiring bandwidth information from local router 325, or determining network congestion occurring in customer premises network 210 or WWAN 130.

Additionally, or alternatively, a notification may be sent regarding the available bandwidth (block 960A). In some implementations, video client 110 may notify CDN 246, other CDNs 270, or VoD provider CDN manager 250 of the amount of bandwidth currently available to video client 110. In other embodiments, however, video client 110 may only notify CDN 246 (not the other CDNs 270 or VoD provider CDN manager 250) of the amount of bandwidth currently available. This discrepancy may be due to, for example, only CDN 246 being capable of actively managing network resources, downloads, or other network conditions or events. As discussed below, notifying CDN 246 of the amount of bandwidth currently available may lead to, for example, CDN 246 increasing or decreasing a download rate allocated to video client 110.

Process 900A may also include downloading VoD content at a specified rate (block 970A). For example, video client 110 may operate to download VoD content at a download rate specified by CDN 246. In some implementations, process 900A may include waiting for a specified time interval to expire (block 980A) and/or determining whether the VoD content has finished downloading (block 990A). In some implementations, process 900A may not include an operation to wait for a specified time interval to expire (block 980A).

Available bandwidth may be re-measured (block 995A). For example, video client 110 may re-measure the amount of bandwidth that is currently available at zero or more points during the download operation. In some implementations, video client 110 may do so as a result of a current download not finishing (block 990A—No) after a specified time interval has expired (block 980). As depicted, process 900A may also include re-executing one or more previous operations beginning with, for example, communicating a notification of the available bandwidth (block 960A). In some embodiments, re-executing such operations may prompt CDN 246 to increase or decrease a current download rate of video client 110.

Referring now to FIG. 9B, a measurement of the available bandwidth may be performed (block 910B). For example, video client 110 may operate to measure an amount of bandwidth that is currently available for downloading VoD content. In some implementations, video client 110 may do so in response to the user indicating that VoD content will be viewed immediately (block 920A—Yes). As discussed above, video client 110 may measure available bandwidth using one or more of a variety of operations or techniques. Depending on the implementations, process 900B may also include notifying a VoD content source (e.g., CDN 246) of the available bandwidth.

VoD content may be buffered and downloaded (block 920B). For example, video client 110 may manage an internal buffer for downloading VoD content. In some implementations, the size of the buffer may dynamically change depending on, for example, the bandwidth available to video client 110. For instance, if the measured bandwidth is relatively low, video client 110 may increase the size of the buffer, to better ensure a quality viewing experience for the user. Alternatively, if the measured bandwidth is relatively high, video client 110 may decrease the size of the buffer to, for example, avoid unnecessary delays in viewing the VoD content. In some implementations, video client 110 may monitor the size of the buffer during the download operation and/or request an increased download rate if, for example, the size of the buffer diminishes below a selected threshold.

Process 900B may include waiting for a specified time interval to expire (block 930B) and/or determining whether the VoD content has finished downloading (block 940B). For example, video client 110 may periodically determine whether a download operation has completed (block 940B). In some implementations, process 900B may not include waiting for a specified time interval (block 930B). In some implementations, the available bandwidth may be re-measured (block 950B) and/or a determination may be made about whether to request a download rate change (block 960B). For example, in some implementations, video client 110 may decide to request a download rate increase (block 970B) if the currently available bandwidth would permit a faster download speed from CDN 246 (block 960B—Yes). As depicted, process 900B may also include re-executing one or more operations in process 900B, beginning, for example, with waiting for a specified time interval to expire (block 930B). In some implementations, re-executing certain operations may, for example, prompt CDN 246 to increase the rate at which video client 110 is currently downloading VoD content.

Although FIGS. 9A-9B show flowcharts of an example process 900 for downloading VoD content, in other implementations, a process for downloading VoD content may include fewer operations, different operations, differently arranged operations, or additional operations than those depicted in FIGS. 9A-9B.

Figure 10:
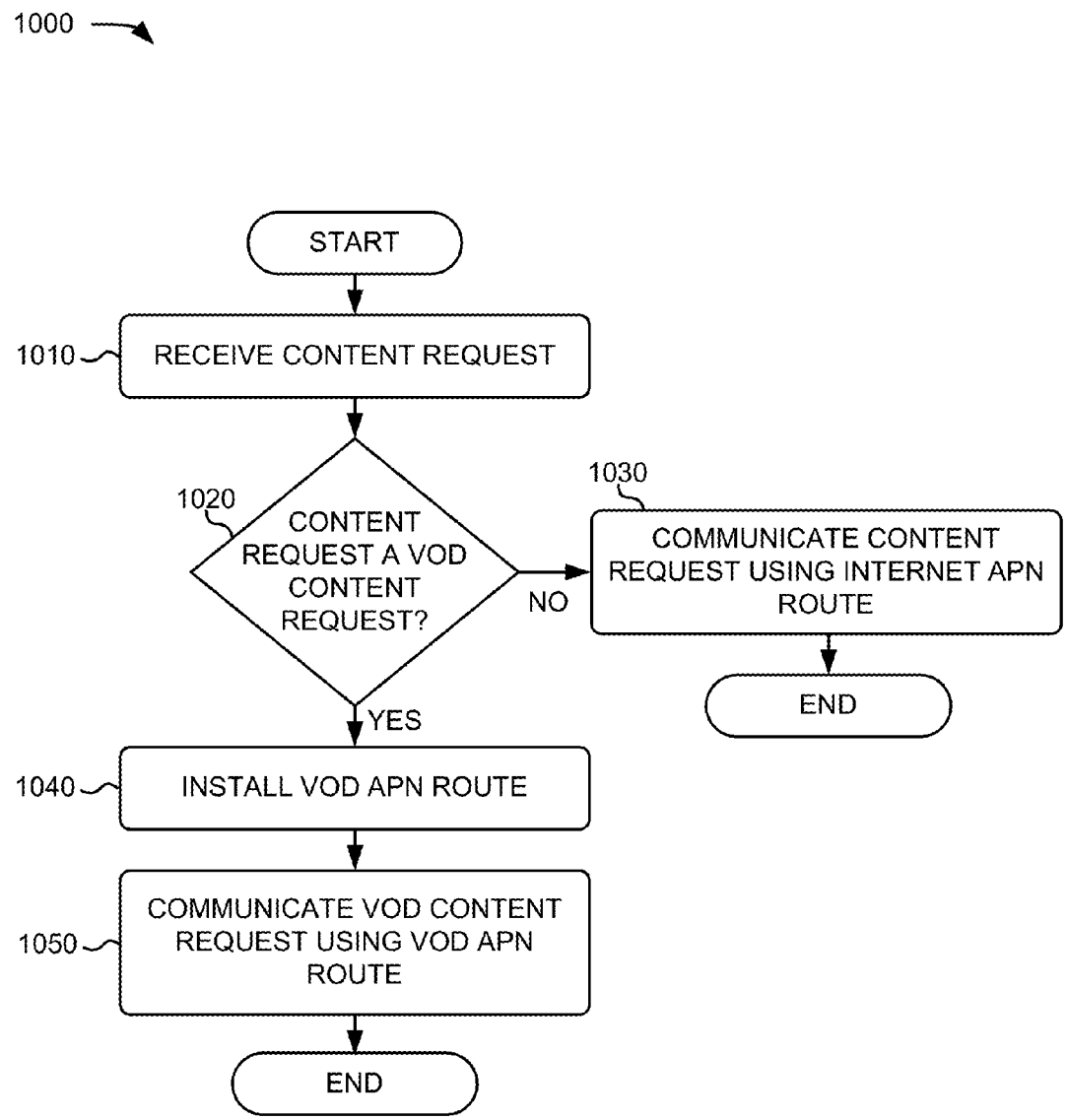
FIG. 10 is a flowchart of an example process for installing a VoD access point name (APN) route.

FIG. 10 is a flowchart of an example process 1000 for installing a VoD APN route. In one or more implementations, process 1000 may be performed by one or more components, modules, or devices of outdoor broadband unit 354. In other implementations, one or more blocks of process 1000 may be performed by one or more other components, modules, or devices, or a group of components, modules, or devices, including or excluding the components, modules, or devices of outdoor broadband unit 354.

Process 1000 may include receiving a content request (block 1010). In certain implementations, this may include outdoor broadband unit 354 receiving a content request from video client 110 via a LAN interface or another interface of communication interface 560. In other implementations, the content request may be received from a device other than video client 110, such as a telephone, a computer, or another user device 320. Additionally, or alternatively, the content request may include a variety of requests, including a request for VoD services or Internet services (e.g., a request to view a webpage, access an e-mail account, execute an online banking transaction, etc.). In some implementations, the content request may be in the form of an HttpGetUrl message.

A determination may be made whether the content request corresponds to a VoD content request (block 1020). For example, outdoor broadband unit 354 may distinguish between different types of requests, including VoD content requests and Internet content requests. In some implementations, outdoor broadband unit 354 may do so by identifying content request information (e.g., information in the content request) and comparing the content request information to information associated with one or more previously identified VoD sources (e.g., CDN 246 or other CDNs 270). In some implementations, this may include outdoor broadband unit 354 identifying a URL of the content request and performing a domain name lookup operation using the URL of the content request, in order to obtain a destination IP address for the content request. Additionally, or alternatively, outdoor broadband unit 354 may access IP addresses of known VoD content sources, such as CDN 246 or other CDNs 270, and compare the destination IP address of the content request with the IP addresses of known VoD content sources to determine whether the content request is a VoD content request. In some implementations, outdoor broadband unit 354 may use additional, or alternative, information, such as partial URLs or domain names to determine whether a content request corresponds to a VoD content request.

A content request may be communicated using an Internet APN route (block—1030). For example, outdoor broadband unit 354 may forward or otherwise communicate a content request to WWAN 130, using an Internet APN route. In some implementations, outdoor broadband unit 354 may do so in response to, for example, determining that the content request is not a VoD content request (block 1020—No). In certain implementations, an Internet APN route may be set up when the outdoor broadband unit 354, or one or more components thereof, is initially installed, activated, updated, or reset, or as part of another operation. In some implementations, an Internet APN route may include a variety of routing parameters including an APN designated by WWAN 130 for Internet traffic and/or non-VoD traffic.

Additionally, or alternatively, a VoD APN route may be installed (block 1040). For instance, outdoor broadband unit 354 may install a VoD APN route corresponding to a VoD content request. In some implementations, outdoor broadband unit 354 may do so in response to, for example, determining that a content request is a VoD content request (block 1020—Yes). A VoD APN route may be exclusively designated for VoD traffic between video client 110 and CDN 246 or other CDNs 270. As discussed above, installing a VoD APN route may include configuring a routing path designated for VoD traffic between video client 110 and CDN 246 or other CDNs 270, including an appropriate source IP (e.g., SrcIP), destination IP (DstIP), APN information (e.g., network identifier), or other networking parameters.

Process 1000 may also, or alternatively, include communicating a VoD content request via the VoD APN route (block 1050). For example, outdoor broadband unit 354 may forward or otherwise communicate a VoD content request to CDN 246 or other CDNs 270, using the VoD APN route. In certain implementations, the VoD APN route may connect to a WWAN, such as WWAN 130 or LTE network 240.

Although FIG. 10 shows a flowchart of an example process 1000 for installing a VoD APN route, in other implementations, a process for installing a VoD APN route may include fewer operations, different operations, differently arranged operations, or additional operations than those depicted in FIG. 10.

Figure 11:
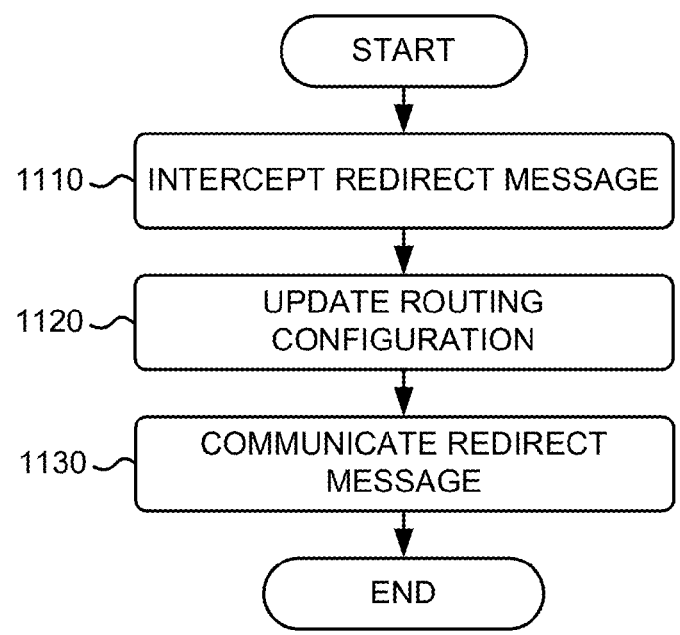
FIG. 11 is a flowchart of an example process for updating a VoD APN route.

FIG. 11 is a flowchart of an example process 1100 for updating a VoD APN route. In some implementations, process 1100 may be performed by one or more components, modules, or devices of outdoor broadband unit 354. In other implementations, one or more blocks of process 1100 may be performed by one or more other components, modules, or devices, or a group of components, modules, or devices, including or excluding the components, modules, or devices outdoor broadband unit 354.

Process 1100 may include intercepting a redirect message (block 1110). For example, outdoor broadband unit 354 may monitor a VoD APN route, identify a redirect message from CDN 246 to video client 110, and intercept the redirect message before the redirect message arrives at video client 110. In certain implementations, the redirect message may be an HttpRedirect message originating from CDN 246 or other CDNs 270. In some implementations, the redirect message may include one or more commands or instructions for video client 110 to download previously requested VoD content from a new location, such as a different location on the same CDN server, a different server in the same CDN, or a different CDN.

A routing configuration may be updated (block 1120). For instance, outdoor broadband unit 354 may update a current routing configuration in response to receiving a redirect message. In some implementations, this may include installing a new VoD APN route based on the redirect message. In such implementations, the new VoD APN route may include creating a new data path for VoD traffic using an appropriate source IP, destination IP, APN information, or other network parameters. Additionally, or alternatively, outdoor broadband unit 354 may update a routing configuration by modifying an existing VoD APN route. In some implementations, this may include using information contained in the redirect message to modify a URL, domain, IP address, or other parameter or characteristic relating to the existing VoD APN route. In some implementations, updating a routing configuration may also, or alternatively, include temporarily storing a URL, domain name, IP address, or other portion of the redirect message.

A redirect message may be communicated (block 1130). For example, outdoor broadband unit 354 may forward or otherwise communicate the redirect message to an appropriate destination, such as video client 110. In some implementations, this may include communicating the redirect message to video client 110 via a LAN, such as customer premises network 210.

Although FIG. 11 shows a flowchart of an example process 1100 for updating a VoD APN route, in other implementations, a process for updating a VoD APN route may include fewer operations, different operations, differently arranged operations, or additional operations than those depicted in FIG. 11.

Figure 12:
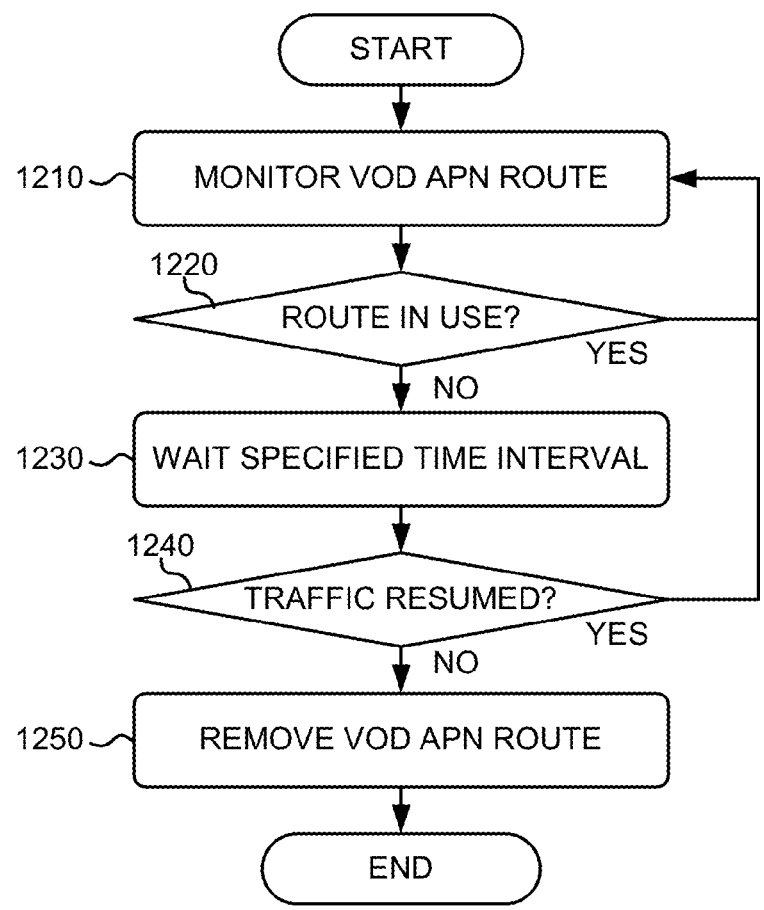
FIG. 12 is a flowchart of an example process for removing a VoD APN route.

FIG. 12 is a flowchart of an example process 1200 for removing a VoD APN route. In one or more implementations, process 1200 may be performed by one or more components, modules, or devices of outdoor broadband unit 354. In other implementations, one or more blocks of process 1200 may be performed by one or more other components, modules, or devices, or a group of components, modules, or devices, including or excluding the components, modules, or devices of outdoor broadband unit 354.

Process 1200 may include monitoring a VoD APN route (block 1210). For example, outdoor broadband unit 354 may inspect or otherwise identify messages and other data passing along a VoD APN route. In some implementations, outdoor broadband unit 354 may monitor the VoD APN route for specific messages or other data. However, outdoor broadband unit 354 may also, or alternatively, monitor the VoD APN route for general usage. For instance, outdoor broadband unit 354 may periodically determine whether a VoD APN route is still in use (block 1220). In some implementations, outdoor broadband unit 354 may monitor a VoD APN route upon installing the VoD APN route (see, for example, block 1040 of FIG. 10). In some implementations, outdoor broadband unit 354 may also, or alternatively, monitor the VoD APN route in response to determining that the VoD APN route is in use (block 1220—Yes (and block 1240—Yes)).

Process 1200 may also, or alternatively, include waiting for a specified time interval to expire (block 1230) and/or determining whether use of the VoD APN route has resumed (block 1240). For example, outdoor broadband unit 354 may be capable of waiting for a specified period of time before determining whether use of a VoD APN route has resumed. Process 1200 may also, or alternatively, include removing a VoD APN route (block 1250). For instance, outdoor broadband unit 354 may operate to uninstall, dismantle, or otherwise remove a VoD APN route. In some implementations, outdoor broadband unit 354 may do so in response to determining that the traffic along the VoD APN route has not resumed (block 1240—No) after a specified time interval (block 1230).

Although FIG. 12 shows a flowchart of an example process 1200 for removing a VoD APN route, in other implementations, a process for removing a VoD APN route may include fewer operations, different operations, differently arranged operations, or additional operations than those depicted in FIG. 12.

Figure 13:
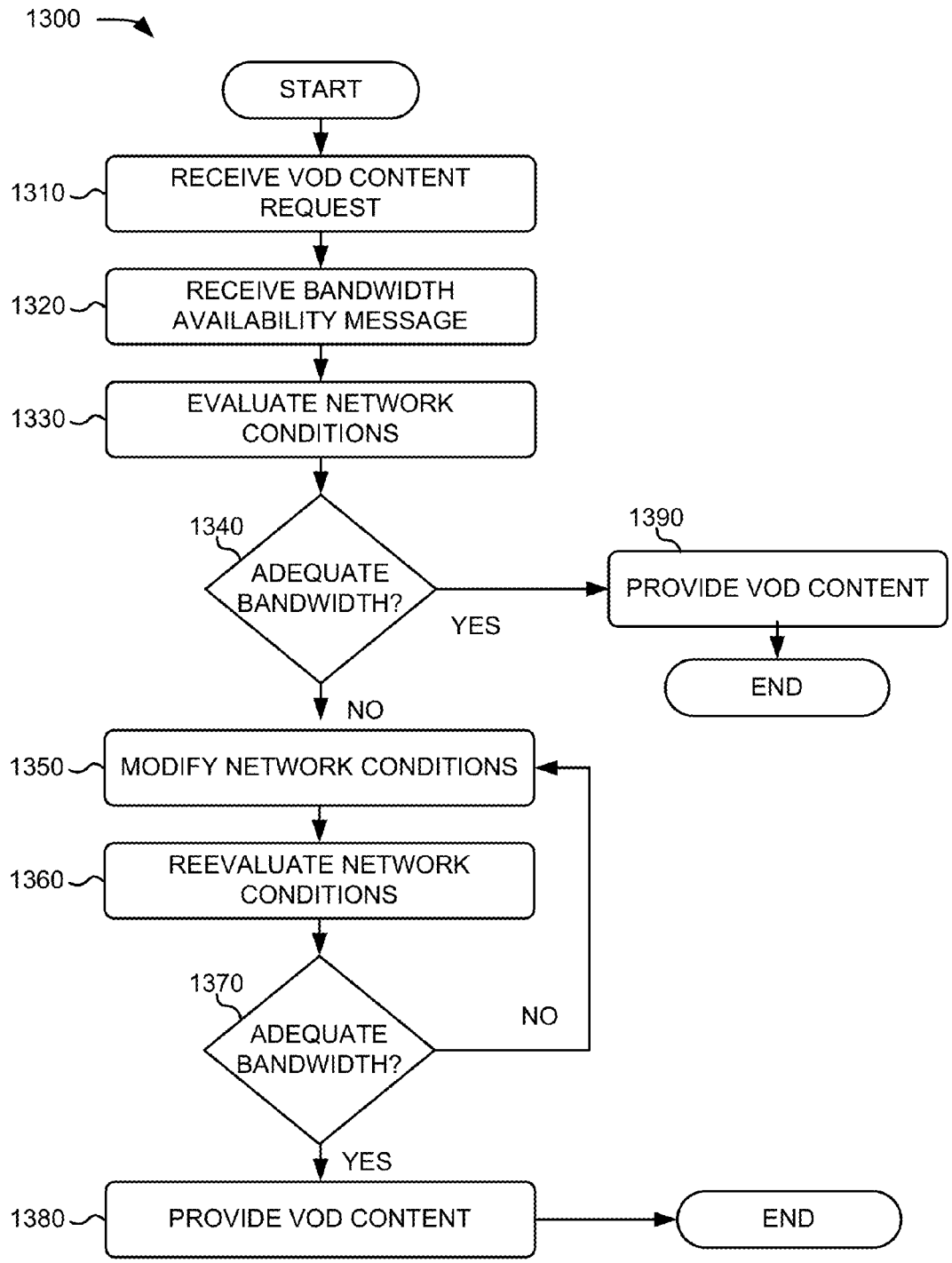
FIG. 13 is a flowchart of an example process for optimizing a network.

FIG. 13 is a flowchart of an example process 1300 for optimizing network resources. In one or more implementations, process 1300 may be performed by one or more components, modules, or devices of CDN 246. In other implementations, one or more blocks of process 1300 may be performed by one or more other components, modules, or devices, or a group of components, modules, or devices, including or excluding the components, modules, or devices of CDN 246.

Process 1300 may include receiving a VoD content request (block 1310). In certain implementations, this may include a VoD content source, such as CDN 246, receiving a VoD content request from video client 110. In some implementations, the VoD content request may be in the form of an HttpGetUrl message. The VoD content request may include a URL corresponding to VoD content stored by, or otherwise under the control of, CDN 246. Additionally, or alternatively, the VoD content request may have been sent by video client 110 via WWAN 130 or LTE network 240.

In some implementations, a VoD content request may include a viewing schedule corresponding to the VoD content requested (e.g., a notice of when the VoD content will be viewed). In some implementations, receiving a VoD content request may also, or alternatively, include receiving other data, including a specified viewing or resolution quality. In certain implementations, the viewing schedule and other information may be received before, after, or at the same time as the VoD content request.

Process 1300 may also include receiving a bandwidth availability message (block 1320). For example, CDN 246 may receive a bandwidth availability message from the same device as the VoD content request (e.g., video client 110). As discussed above, a bandwidth availability message may describe the bandwidth or potential download rate currently available to video client 110. Process 1300 may also, or alternatively, include evaluating network conditions (block 1330). For example, CDN 246 may evaluate network conditions by executing one or more of a variety of operations, including measuring network congestion or measuring current load conditions of CDN 246 or one or more CDN servers thereof.

A determination may be made whether there is adequate bandwidth (block 1340). For example, CDN 246 may operate to determine whether there is enough bandwidth for video client 110 to download the VoD content requested by the video client. In making this determination, CDN 246 may consider, for example, a viewing schedule specified by the user, the bandwidth availability message received from video client 110, or the evaluated network conditions.

Process 1300 may include modifying network conditions (block 1350). For instance, CDN 246 may modify network conditions by performing one or more of a variety of network management operations, including pausing or reducing a download rate of one or more ongoing download operations. In some implementations, CDN 246 may only pause or reduce the download rate of video clients 110 with flexible viewing schedules (e.g., video clients 110 that have indicated that the VoD content requested will be viewed at a later time).

In certain implementations, modifying network conditions may include considering a priority assigned to one or more ongoing downloads. Additionally, or alternatively, modifying network conditions may include determining whether another CDN or CDN device would be better suited to provide the VoD content requested and operating accordingly. In some implementations, CDN 246 may modify network conditions in response to a determination that there is insufficient bandwidth for video client 110 to download the VoD content at a rate consistent with a viewing schedule specified by video client 110 (block 1340—No).

Process 1300 may also, or alternatively, include reevaluating network conditions (block 1360). In some implementations, reevaluating network conditions may include CDN 246 re-executing one or more of the operations discussed above with respect to evaluating network conditions. Process 1300 may also, or alternatively, include reconsidering whether there is adequate bandwidth for video client 110 to download the requested VoD content (block 1370). In some implementations, if the available bandwidth is still inadequate (block 1370—No), then CDN 246 may, for example, again modify and reevaluate network conditions to make adequate bandwidth available (blocks 1350 and 1360).

As depicted, VoD content may be provided (blocks 1380 and 1390). For example, CDN 246 may communicate VoD content to video client 110. In some implementations, CDN 246 may do so in response to determining that there is adequate bandwidth for the video client 110 to download the VoD content in accordance with a viewing schedule associated with the video client 110 (block 1370—Yes, and block 1340—Yes).

Although FIG. 13 shows a flowchart of an example process 1300 for optimizing network resources, in other implementations, a process for optimizing network resources may include fewer operations, different operations, differently arranged operations, or additional operations than those depicted in FIG. 13.

Figure 14:
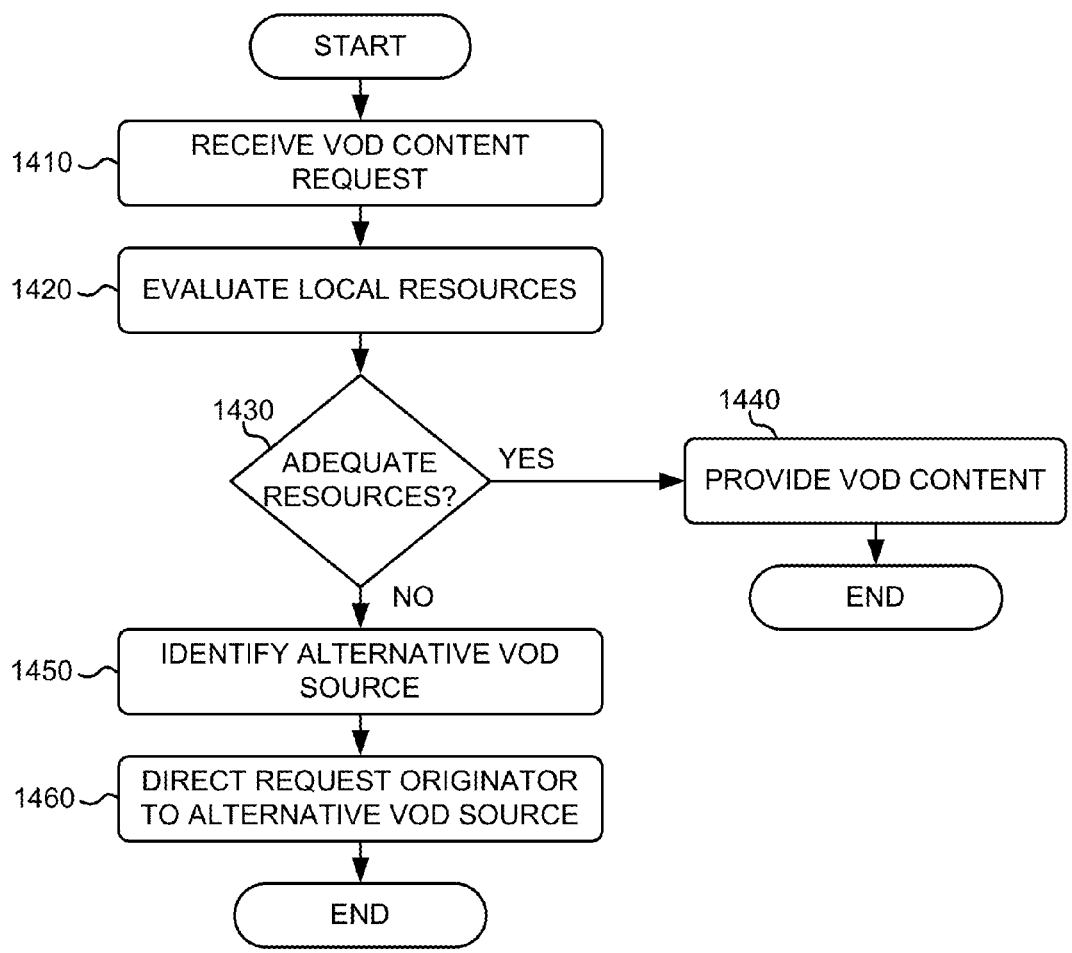
FIG. 14 is a flowchart of another example process for optimizing a network.

FIG. 14 is a flowchart of process 1400 for optimizing network resources. In one or more implementations, process 1400 may be performed by one or more components, modules, or devices of CDN 246. In other implementations, one or more blocks of process 1400 may be performed by one or more other components, modules, or devices, or a group of components, modules, or devices, including or excluding the components, modules, or devices of CDN 246.

Process 1400 may include receiving a VoD content request (block 1410). In certain implementations, this may include a VoD content source (e.g. CDN 246) receiving a request for VoD content from video client 110. Process 1400 may also, or alternatively, include, evaluating local resources (block 1420). In some implementations, evaluating local resources may include CDN 246 monitoring and/or identifying a current usage amount of one or more internal resources, such as processing capacity, memory capacity, storage capacity, or capacity of other device resources. In certain implementations, evaluating local resources may include CDN 246 evaluating one or more resources of specific CDN servers or other CDN devices.

Process 1400 may include determining whether there are adequate resources to provide the requested VoD content (block 1430). For example, CDN 246 may determine whether there are sufficient local resources to provide VoD content or other services to video client 110. In some implementations, this determination may depend on a variety of factors, including factors relating to the VoD content request (e.g., viewing schedule, requested resolution, etc.) and/or an evaluation of currently available resources.

VoD content may be provided (block 1440). For example, CDN 246 may provide VoD content to video client 110 via WWAN 130. In certain implementations, CDN 246 may do so in response to determining that CDN 246 has adequate resources to do so (block 1430—Yes).

Process 1400 may also, or alternatively, include identifying an alternative VoD source (e.g. other CDNs 270) (block 1450). In some implementations, this may include CDN 246 identifying VoD content sources (which may include alternative servers of CDN 246 or other CDNs 270) that are storing, or otherwise have access to, a copy, version, or instance, of the requested VoD content. Additionally, or alternatively, identifying an alternative VoD source may include CDN 246 communicating with one or more VoD provider CDN managers 250 for assistance in identifying an alternative CDN. Identifying an alternative VoD source may also, or alternatively, include ensuring that the alternative VoD source has adequate internal resources and network conditions are appropriate to provide video client 110 with the requested VoD content. In some implementations, CDN 246 may identify alternative VoD sources in response to determining that CDN 246 does not have adequate resources to provide video client 110 with VoD content (block 1430—No).

Process 1400 may also include directing an originator of a VoD content request to an alternative VoD source (block 1460). For example, CDN 246 may instruct video client 110 to obtain VoD content from another CDN, such as other CDNs 270. This may also, or alternatively, include CDN 246 obtaining a URL corresponding to the copy or version of the requested VoD content stored by other CDNs 270 and/or communicating the URL to video client 110. In certain implementations, this may also, or alternatively, include communicating an HttpRedirect message with an appropriate URL to video client 110.

Although FIG. 14 shows a flowchart of an example process 1400 for optimizing a network, in other implementations, a process for optimizing a network may include fewer operations, different operations, differently arranged operations, or additional operations than those depicted in FIG. 14.

Figure 15:
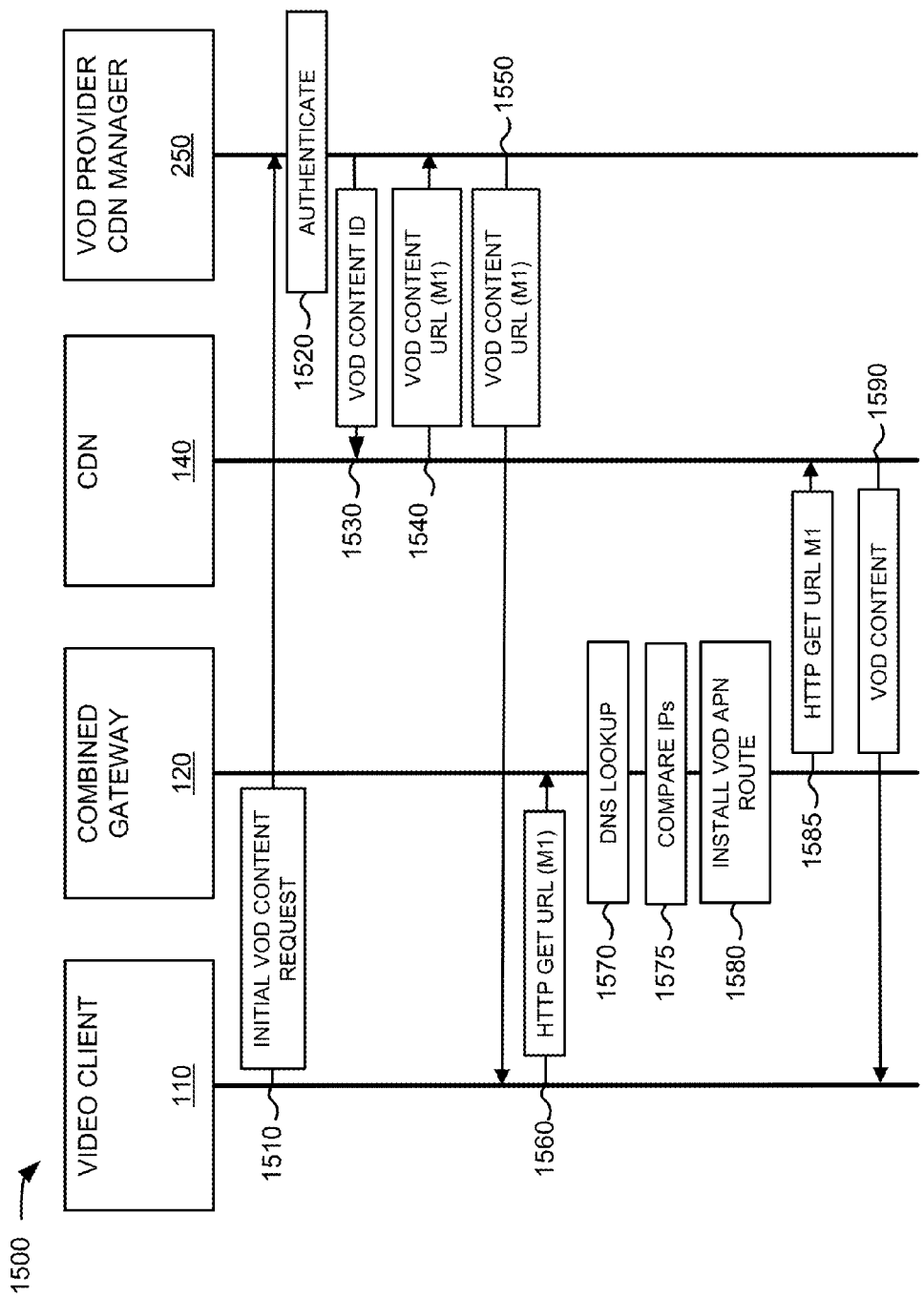
FIG. 15 is a sequence flowchart diagram of an example implementation discussed herein.

FIG. 15 is a sequence flowchart diagram of an example implementation 1500 discussed herein. As shown, example implementation 1500 may include video client 110 communicating an initial VoD content request to VoD provider CDN manager 250 (block 1510). In response thereto, VoD provider CDN manager 250 may execute an identification, authentication, or other processes regarding video client 110 or a user (not shown) of video client 110 (block 1520). VoD provider CDN manager 250 may also communicate a VoD content identity (ID) to CDN 140 (block 1530).

CDN 140 may respond by providing a VoD content URL to VoD provider CDN manager 250 (block 1540). In some implementations, the VoD content URL may be a URL that will only be valid once (e.g., after video client 110 downloads the VoD content using the VoD content URL, the VoD content will no longer be available at the same VoD content URL). Additionally, or alternatively, a VoD content URL may be a URL that will only be valid for a period of time (e.g., 24 hours). The VoD content URL is represented in FIG. 15 as "M1."

VoD provider CDN manager 250 may communicate the VoD content URL to video client 110 (block 1550). Video client 110 may communicate an HttpGetUrl message with the VoD content URL (M1) to combined gateway 120 (block 1560). Combined gateway 120 may, for example, obtain a destination IP address of the HttpGetUrl message by executing a DNS lookup operation using the VoD content URL in the HttpGetUrl message (block 1570). Combined gateway 120 may compare the destination IP address to a list of IP addresses of known VoD content sources (block 1575). In this example, since the IP address of CDN 140 is in the list of IP addresses, combined gateway 120 is able to verify that the HttpGetUrl message corresponds to VoD content. Accordingly, combined gateway 120 may install a VoD APN route between video client 110 and CDN 140 (block 1580) and forward the HttpGetUrl message to CDN 140 (block 1585). CDN 140 may respond by providing the requested VoD content to video client 110 (block 1590).

Although FIG. 15 shows a sequence flowchart diagram of an example implementation discussed herein, in other implementations, a sequence flowchart diagram of another example implementation may include fewer, different, differently arranged, or additional operations, devices, and/or flows than depicted in FIG. 15.

Figure 16:
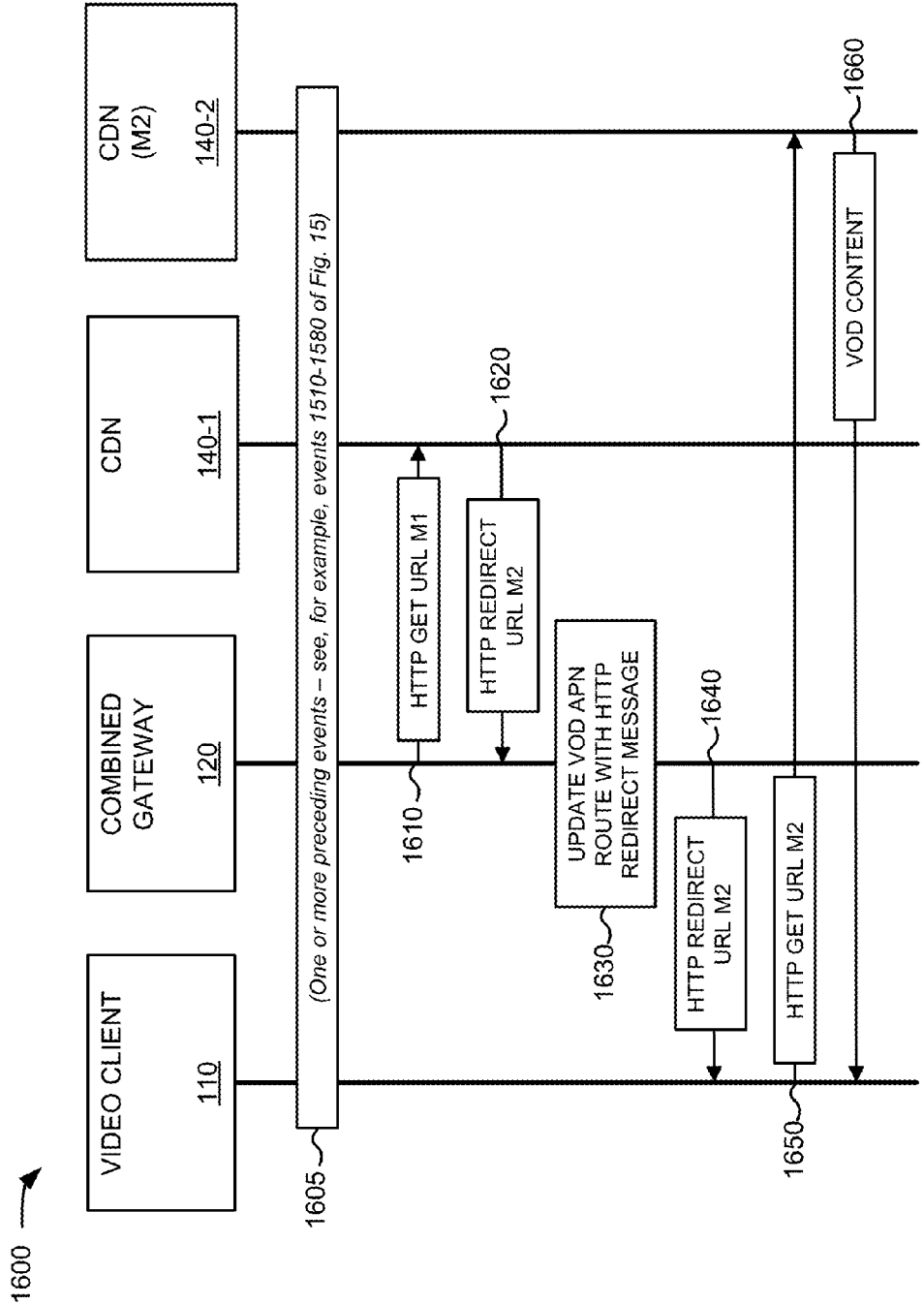
FIG. 16 is a sequence flowchart diagram of an example implementation discussed herein.

FIG. 16 is a sequence flowchart diagram of an example implementation 1600 discussed herein. As shown, example implementation 1600 may include one or more events prior to combined gateway 120 communicating an HttpGetUrl message to CDN 140-1 (blocks 1605 and 1610), and CDN 140-1 responding by communicating an HttpRedirect message (block 1620). In some implementations, CDN 140-1 may do so in response to determining that another CDN or CDN server (e.g., CDN 140-2) is better suited to provide the requested VoD content to video client 110. As such, the HttpRedirect message may include a VoD content URL (M2) corresponding to CDN 140-2.

While the HttpRedirect message may be intended for video client 110, combined gateway 120 may operate to intercept the HttpRedirect message and update an already installed VoD APN route with the HttpRedirect message (block 1630). Combined gateway 120 may communicate the HttpRedirect Message to video client 110 (block 1640), and video client 110 may respond by communicating an HttpGetUrl message using the VoD content URL, M2 (block 1650). CDN 140-2 may receive the HttpGetUrl message and provide the requested VoD content to video client 110 (blocks 1650 and 1660).

Although FIG. 16 shows a sequence flowchart diagram of another example implementation discussed herein, in other implementations, a sequence flowchart diagram of an example implementation may include fewer, different, differently arranged, or additional operations, devices, and/or flows than those depicted in FIG. 16.

The foregoing description of implementations provides illustration and description, but is not intended to be exhaustive or to limit the implementations to the precise form disclosed. Modifications and variations are possible in light of the above teachings or may be acquired from practice of these implementations.

For example, while series of blocks have been described with regard to FIGS. 9A-16, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a "component" that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. An apparatus, comprising:
a memory to store video on demand (VoD) content; and
a processor, connected to the memory, to:
receive, via a wireless wide area network (WWAN), a first request for VoD content and a viewing schedule corresponding to the VoD content from a video client,
receive bandwidth availability data from the video client,
evaluate network conditions corresponding to the WWAN,
specify a download rate for the video client based on the viewing schedule, the bandwidth availability data, and the network conditions,
provide the VoD content to the video client, via the WWAN, at the specified download rate,
receive a second request for additional VoD content,
evaluate current load conditions for providing the additional VoD content according to the second request,
determine that current load conditions are not acceptable for providing the additional VoD content,
identify at least one content delivery network (CDN) storing a copy of the additional VoD content corresponding to the second request,
verify that the at least one CDN is able to provide the copy of the additional VoD content to the video client, and
direct the video client to obtain the copy of the additional VoD content from the at least one CDN.

2. The apparatus of claim 1, wherein the processor is to:
receive a bandwidth availability update from the video client via the WWAN,
reevaluate network conditions corresponding to the WWAN,
specify a new download rate for the video client based on the viewing schedule corresponding to the VoD content, the bandwidth availability update from the video client, and the reevaluated network conditions corresponding to the WWAN, and
provide the VoD content to the video client, via the WWAN, at the new download rate.

3. The apparatus of claim 1, wherein the processor is further configured to:
    determine, based on the bandwidth availability data, that insufficient bandwidth is available to provide the VoD content via the WWAN at the specified download rate, and
    modify, based on the insufficient bandwidth, one or more of the network conditions.

4. The apparatus of claim 3, wherein, to modify the one or more network conditions, the processor is further configured to at least one of:
    pause a download to another video client, or
    reduce a download rate associated with the other video client.

5. The apparatus of claim 4, wherein the processor is further configured to:
    determine, before the at least one pausing the download or reducing the download rate, that a current downloading associated with the other video client corresponds to an associated flexible viewing schedule.

6. The apparatus of claim 4, wherein the processor is further configured to:
    determine, before the at least one pausing the download or reducing the download rate, that a priority assigned to a current downloading associated with the other video client is below a priority assigned to providing the VoD content at the specified rate.

7. The apparatus of claim 1, wherein the apparatus is located in a first content delivery network (CDN), and the processor is further configured to:
    determine, based on the bandwidth availability data, that insufficient bandwidth is available to provide the VoD content via the WWAN at the specified download rate, and
    determine whether a second CDN can provide the VoD content via the WWAN at the specified download rate.

8. A method comprising:
    storing video on demand (VoD) content;
    receiving, via a wireless wide area network (WWAN), a first request for VoD content and a viewing schedule corresponding to the VoD content from a video client;
    receiving bandwidth availability data from the video client;
    evaluating network conditions corresponding to the WWAN;
    specifying a download rate for the video client based on the viewing schedule, the bandwidth availability data, and the network conditions;
    providing, via the WWAN, the VoD content to the video client at the specified download rate;
    receiving a second request for additional VoD content;
    evaluating current load conditions for providing the additional VoD content in response to receiving the second request;
    determining that current load conditions are not acceptable for providing the additional VoD content based on the evaluating;
    identifying at least one content delivery network (CDN) storing a copy of the additional VoD content based on the determining;
    verifying that the at least one CDN is able to provide the copy of the additional VoD content to the video client; and
    directing the video client to obtain the copy of the additional VoD content from the at least one CDN.

9. The method of claim 8, further comprising:
    receiving, via the WWAN, a bandwidth availability update from the video client;
    reevaluating the network conditions corresponding to the WWAN;
    specifying a new download rate for the video client based on the viewing schedule, the bandwidth availability, and the reevaluated network conditions; and
    providing, via the WWAN, the VoD content to the video client at the new download rate.

10. The method of claim 8, further comprising:
    determining, based on the bandwidth availability data, that insufficient bandwidth is available to provide the VoD content via the WWAN at the specified download rate, and
    modifying, based on the insufficient bandwidth, one or more of the network conditions.

11. The method of claim 10, wherein modifying the one or more network conditions comprises:
    pausing a download to another video client, or
    reducing a download rate associated with the other video client.

12. The method of claim 11, further comprising:
    determining, before pausing the download or reducing the download rate, that a current downloading associated with the other video client corresponds to an associated flexible viewing schedule.

13. The method of claim 11, further comprising:
    determining, before pausing the download or reducing the download rate, that a priority assigned to a current downloading associated with the other video client is below a priority assigned to providing the VoD content at the specified rate.

14. The method of claim 8, wherein the apparatus is located in a first content delivery network (CDN), the method further comprising:
    determining, based on the bandwidth availability data, that insufficient bandwidth is available to provide the VoD content via the WWAN at the specified download rate, and
    determining whether a second CDN can provide the VoD content via the WWAN at the specified download rate.

15. A non-transitory storage medium storing instructions executable by a computational device, wherein the instructions comprise instructions to:
    store video on demand (VoD) content;
    receive, via a wireless wide area network (WWAN), a first request for VoD content and a viewing schedule corresponding to the VoD content from a video client;
    receive bandwidth availability data from the video client;
    evaluate network conditions corresponding to the WWAN;
    specify a download rate for the video client based on the viewing schedule, the bandwidth availability data, and the network conditions;
    provide, via the WWAN, the VoD content to the video client at the specified download rate;
    receive a second request for additional VoD content;
    evaluate current load conditions for providing the additional VoD content in response to receiving the second request;
    determine that current load conditions are not acceptable for providing the additional VoD content based on the evaluating;
    identify at least one content delivery network (CDN) storing a copy of the additional VoD content based on the determining;
    verify that the at least one CDN is able to provide the copy of the additional VoD content to the video client; and
    direct the video client to obtain the copy of the additional VoD content from the at least one CDN.

16. The non-transitory storage medium of claim 15, wherein the instructions comprise further instructions to:
receive, via the WWAN, a bandwidth availability update from the video client;
reevaluate the network conditions corresponding to the WWAN;
specify a new download rate for the video client based on the viewing schedule, the bandwidth availability update, and the reevaluated network conditions; and
provide, via the WWAN, the VoD content to the video client at the new download rate.

17. The non-transitory storage medium of claim 15, wherein the instructions comprise further instructions to:
determine, based on the bandwidth availability data, that insufficient bandwidth is available to provide the VoD content via the WWAN at the specified download rate, and
modify, based on the insufficient bandwidth, one or more of the network conditions.

18. The non-transitory storage medium of claim 17, wherein the instructions to modify the one or more network conditions comprise instructions to:
pause a download to another video client, or
reduce a download rate associated with the other video client.

19. The non-transitory storage medium of claim 18, wherein the instructions comprise further instructions to:
determine, before pausing the download or reducing the download rate, that a current downloading associated with the other video client corresponds to an associated flexible viewing schedule.

20. The non-transitory storage medium of claim 18, wherein the instructions comprise further instructions to:
determine, before pausing the download or reducing the download rate, that a priority assigned to a current downloading associated with the other video client is below a priority assigned to providing the VoD content at the specified rate.

* * * * *